United States Patent
Hill et al.

(10) Patent No.: US 12,348,862 B2
(45) Date of Patent: Jul. 1, 2025

(54) OPERATION MODES FOR AN IN-VEHICLE SECURITY SYSTEM

(71) Applicant: Portable Multimedia Ltd, London (GB)

(72) Inventors: Ceri Hill, London (GB); Graham Lambert, London (GB); Sam Lewis, London (GB)

(73) Assignee: Portable Multimedia Ltd. (GB)

( * ) Notice: Subject to any disclaimer, the term of this patent is extended or adjusted under 35 U.S.C. 154(b) by 0 days.

(21) Appl. No.: 18/924,182

(22) Filed: Oct. 23, 2024

(65) Prior Publication Data

US 2025/0133289 A1    Apr. 24, 2025

(30) Foreign Application Priority Data

Oct. 23, 2023 (GB) .................................... 2316188
Oct. 23, 2023 (GB) .................................... 2316193
Oct. 24, 2023 (GB) .................................... 2316282

(51) Int. Cl.
| | |
|---|---|
| *B60R 25/33* | (2013.01) |
| *B60R 25/102* | (2013.01) |
| *B60R 25/30* | (2013.01) |
| *G06V 20/59* | (2022.01) |
| *H04N 7/18* | (2006.01) |
| *H04N 23/65* | (2023.01) |
| *H04N 23/667* | (2023.01) |

(52) U.S. Cl.
CPC ......... *H04N 23/651* (2023.01); *B60R 25/102* (2013.01); *B60R 25/305* (2013.01); *B60R 25/33* (2013.01); *G06V 20/597* (2022.01); *H04N 7/185* (2013.01); *H04N 23/667* (2023.01)

(58) Field of Classification Search
CPC .... H04N 23/651; H04N 23/667; H04N 7/185; G06V 20/597; B60R 25/102; B60R 25/305; B60R 25/33
USPC .......................................................... 348/148
See application file for complete search history.

(56) References Cited

U.S. PATENT DOCUMENTS

| | | | |
|---|---|---|---|
| 8,108,147 | B1 | 1/2012 | Blackburn |
| 9,869,762 | B1 | 1/2018 | Alland et al. |
| 10,328,947 | B1 | 6/2019 | Hansel et al. |
| 10,421,437 | B1 | 9/2019 | Koskan |
| 10,486,649 | B1 | 11/2019 | Bennie et al. |
| 10,869,002 | B2 | 12/2020 | Krökel |
| 10,899,316 | B1 | 1/2021 | Moeller et al. |
| 11,448,750 | B2 | 9/2022 | Chun et al. |

(Continued)

FOREIGN PATENT DOCUMENTS

| | | |
|---|---|---|
| JP | 2022-034107 A | 3/2022 |
| KR | 2011 0112506 A | 10/2011 |

(Continued)

*Primary Examiner* — Nguyen T Truong
(74) *Attorney, Agent, or Firm* — Klarquist Sparkman, LLP

(57) ABSTRACT

A security system for an in-vehicle digital video recorder, comprising a sensor and a processing resource, the security system operative in: a first mode in which the sensor is operative at a first resolution; and a second mode in which the sensor is operative at a second resolution higher than the first resolution; the security system operative to receive signals from the sensor; wherein in the first mode the security system invokes the second mode responsive to a sensor signal exceeding a threshold value; and wherein in the second mode the processing resource monitors to determine if a security threat criterion is satisfied based on a received sensor signal.

25 Claims, 13 Drawing Sheets

(56) References Cited

U.S. PATENT DOCUMENTS

| | | |
|---|---|---|
| 11,532,221 B1 | 12/2022 | Rogan et al. |
| 11,703,583 B1 | 7/2023 | Skeoch et al. |
| 11,780,405 B1 | 10/2023 | Bell |
| 11,972,669 B2 | 4/2024 | Rogan et al. |
| 2010/0198463 A1 | 8/2010 | Plaster |
| 2013/0135444 A1 | 5/2013 | Stein et al. |
| 2015/0278610 A1 | 10/2015 | Renner et al. |
| 2017/0309997 A1 | 10/2017 | Alland et al. |
| 2018/0367731 A1 | 12/2018 | Gatti et al. |
| 2019/0039517 A1 | 2/2019 | Hoyda et al. |
| 2019/0289282 A1 | 9/2019 | Briggs et al. |
| 2019/0293787 A1 | 9/2019 | Sakai et al. |
| 2019/0377814 A1 | 12/2019 | Shtrom et al. |
| 2020/0168014 A1 | 5/2020 | Uliyar et al. |
| 2020/0349723 A1 | 11/2020 | Geva et al. |
| 2021/0080561 A1 | 3/2021 | Wodrich et al. |
| 2021/0097315 A1 | 4/2021 | Carruthers et al. |
| 2021/0250554 A1 | 8/2021 | Liu et al. |
| 2021/0318135 A1 | 10/2021 | Chandupatla et al. |
| 2021/0341583 A1 | 11/2021 | Adams et al. |
| 2023/0077868 A1 | 3/2023 | Burns et al. |
| 2024/0210545 A1 | 6/2024 | Wagner |
| 2024/0212186 A1 | 6/2024 | Heinrich et al. |
| 2024/0253595 A1 | 8/2024 | Papanikolaou et al. |

FOREIGN PATENT DOCUMENTS

| | | |
|---|---|---|
| WO | WO 2007/042798 A2 | 4/2007 |
| WO | WO 2021/180865 A1 | 9/2021 |
| WO | WO 2022/141337 A1 | 7/2022 |

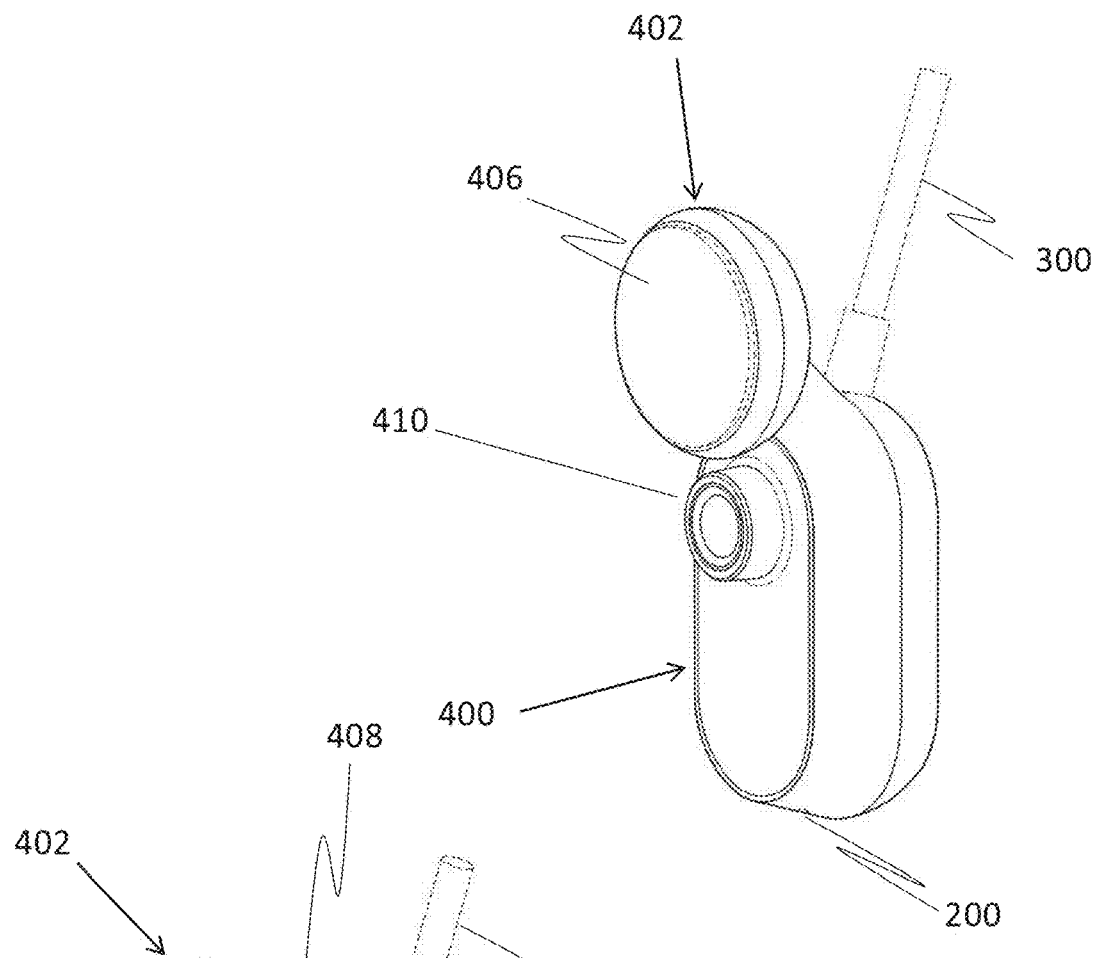
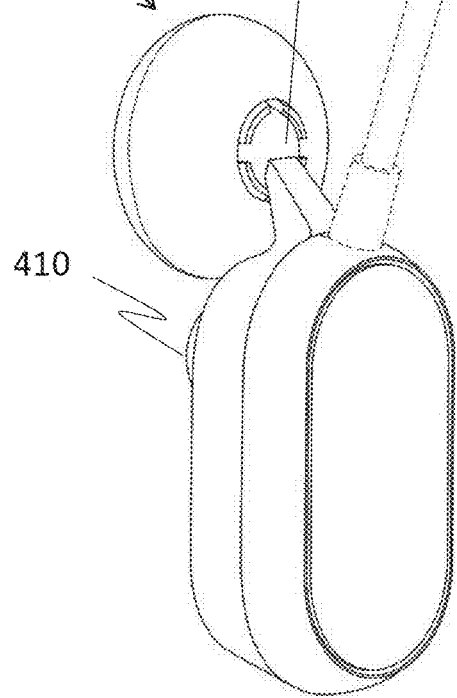
FIG. 3a
FIG. 3b

OPERATION MODES FOR AN IN-VEHICLE SECURITY SYSTEM

CROSS REFERENCE TO RELATED APPLICATIONS

This application claims the benefit of United Kingdom Patent Application Nos. GB2316188.8, and GB2316193.8, filed on Oct. 23, 2023, and United Kingdom Patent Application No. GB Patent Application No. GB2316282.9, filed on Oct. 24, 2023. The prior applications are incorporated herein by reference in their entirety.

FIELD

The present invention relates to security systems, in particular but not exclusively, vehicle security systems and methods for multi-mode operation of sensors to monitor and respond to security threats related to a vehicle.

BACKGROUND

An in-vehicle digital video recorder often referred to as a dashcam, is a device used within vehicles to provide a visual indication and record of the environment in and or around a vehicle in which it is mounted during periods of the vehicle's use. A dashcam is typically mounted on the dashboard or the windscreen of a vehicle and comprises a camera having a lens positioned such that it is operative to record images that can be seen through the front windscreen. A dashcam typically has access to some kind of power source. This power source is typically the vehicle battery and is accessed via an electrical cable.

Typical dashcams may record image data and retain this image data on internal storage. Optionally or alternatively, this image data can be transferred to an external storage facility such as by a cable or wireless connection. Dashcams may further comprise speakers, inertial motion sensors, location sensors or other sensors. They may also store data from such sensors on board the device or may transfer this data to an external system again such as by wireless or cabled connection. Some devices may only record events that exceed a threshold of some kind, such as a threshold acceleration.

Such dashcams allow users to produce a record of the events encountered whilst driving and can be reviewed to identify the series of events that led to an accident, for example. The dashcam can have a forward and rearward facing image sensor to provide information on the state of events inside the vehicle e.g., of the behaviour of the driver or of the passengers, and of other road users external to the vehicle viewed through the front windscreen. This can help to better identify dangerous or negligent driving by the driver of the vehicle or of other vehicles as seen through the front windscreen and can aid in reports pertaining to serious traffic accidents.

Dashcams commonly only operate during periods in which the vehicle is in motion, as the vehicle's alternator charges the vehicle battery and thereby avoids the power consumption of the dashcam and the vehicle from exceeding the capacity of the battery and thereby causing the battery state of charge to fall below a critical level. If such a dashcam is left to operate after the vehicle engine is switched off, the battery of the vehicle may eventually be depleted, and no power is left to provide the vehicle's starter motor with enough power to start the engine to then charge the battery.

A security camera is device that is installed on objects and/or devices that are commonly stationary as a way to record events that occur in and/or around them whilst a user is not present. Typically, security cameras will comprise at least one camera image device and may also comprise a microphone sensor. These devices are commonly mounted on the objects and/or devices in locations that are inconspicuous if they are intended to act as surveillance devices, or in plain sight if they are intended to operate as deterrents. These devices generally have a permanent power supply as they are most commonly static devices, and therefore typically do not need to be switched off. They may also be provided with a permanent cabled or wireless link to a storage medium to which image data and/or audio data may be sent.

Security cameras are able to provide image data recordings on events that occurred at times when a user may not be in attendance. An example may be a security camera capturing images of the front of a house during the night when the owners of the house are not able to monitor the front of their house consciously. Some security cameras idle until an event triggers them into an operation mode in which they capture image data. These triggers may comprise detection of an object via infrared sensor, or by comparing frames of captured image data and detecting differences which imply movement.

One or more embodiments of the present invention comprise a device able to function as both a dashcam and a security cam for use within a vehicle. This device is able to provide dashcam functionality whilst the vehicle is in motion to record the vehicle's environment and to capture driving related events; and additionally, is able to record the vehicle's environment during periods in which the vehicle is stationary. This functionality provides challenges regarding the power consumption of the device. However, the device is able to manage its power consumption by monitoring the battery level and providing mode of operation which consume less power based on the vehicle battery state of charge.

Dashcams are typically configured to operate only when the vehicle's engine is running such that the vehicle's electrical power level remains sufficient for essential functions, i.e. relying on the power provided by an alternator of the vehicle to ensure that power available from the vehicle battery is not fully depleted by the operation of the dashcam. In this way, the dashcam can avoid draining the vehicle battery and can capture image data of driving events. Configuring the dashcam such that it only operates whilst the vehicle is operational i.e. when the engine is running, aligns the operation of the dashcam with periods of time in which the vehicle is being driven and in which the driver is likely to require video footage, the assumption being that driving events that the user would wish to capture are unlikely to occur whilst the engine is off and the vehicle is stationary. The power consumption of the dashcam is limited to periods of time in which the battery of the vehicle is being charged, such that the presence of the dashcam will not exhaust the power source of the vehicle. The dashcam is not activated in periods of time in which the only activity to record is the behaviour of the vehicle's surroundings, thus limiting the power consumption of the dashcam to periods in which the power source is protected.

Dashcams are increasingly being used to provide a record of the events that led to an accident or driving related incident. It may be desirable to provide such a record in situations in which the vehicle is not in use, such as when the vehicle is parked or otherwise stationary. Likewise, insurance companies may wish to monitor the environment of insured vehicles whether in a commercial fleet or for private use to provide more accurate estimates of premiums and to obtain information pertaining to damage sustained by the vehicle for the purposes of processing insurance claims.

However, current dashcams would be unable to incorporate and operate sensors for performing this function as there exists no suitable power supply on board the vehicle. Running such a dashcam whilst the engine of the vehicle is not running would require the vehicle battery to supply power to the dashcam without the support of an alternator replenishing the battery. After a period of operation of the dashcam, the vehicle battery would no longer be able to provide sufficient power to the starter motor of a vehicle upon start up. After a longer period of time, the vehicle battery would be run entirely flat via the operation of the dashcam.

Aspects and embodiments of the present invention have been devised with the foregoing in mind.

SUMMARY

According to an aspect of the present invention there is provided an in-vehicle security system for an in-vehicle digital video recorder which comprises a sensor and a processing resource. The security system is operative in a first mode in which the sensor is operative at a first resolution; and a second mode in which the sensor is operative at a second resolution higher than the first resolution. The security system operative to receive signals from the sensor; wherein in the first mode the security system invokes the second mode responsive to a sensor signal exceeding a threshold value; and wherein in the second mode the processing resource monitors to determine if a security threat criterion is satisfied based on a received sensor signal.

This in-vehicle security system utilizes a low-power first mode for routine monitoring, only escalating to a higher-power second mode when sensor inputs exceed a defined activity threshold. Operating primarily in the low-power mode conserves computational resources, enabling extended operational times between charging cycles. Transition to the secondary high-resolution mode is reserved for significant sensor events meriting additional analysis, avoiding unnecessary activation and wasted energy on insignificant triggers. The threshold test renders a preliminary screening, filtering noise from true threats before engaging heightened processing. This staged approach may decrease false positives and data storage requirements, while still permitting rapid response to qualified threats. Overall, the tiered design optimizes performance and efficiency by aligning analysis capabilities with situational demands.

Suitably, a mode exists in which power intensive sensors such as camera sensors are not used or not used to their full resolution. This allows the in-vehicle security system to operate at a lower power consumption without having to shut down.

Optionally, the in-vehicle security system is operative to maintain the second mode responsive to the processing resource determining a system condition is satisfied. This allows the system to remain in a lower alert state if no threat is detected, avoiding unnecessary alarms or disruptions.

Optionally, wherein the system condition is expiry of a first system time duration. This first system time duration is configurable and stored in a system memory wherein the first system time duration is between 50-1000 milliseconds (ms). Maintaining the mode for a set duration may avoid rapid toggling between modes which could be disruptive. Furthermore, this may provide for a threat to clear or be re-evaluated after a reasonable delay. Additionally, the system can conserve power and battery life compared to continuous monitoring. This enables longer operation on a single charge.

Optionally, wherein the system condition to maintain the security system in the second mode is traversal of a first system number of security threat criterion cycles. This first system number of security threat criterion cycles is configurable and stored in a system memory wherein the first system time duration is between 100-500 milliseconds (ms) The first system number of security threat criterion cycles allow the system to have focused security for a period of time rather than indefinitely staying in the second mode. This provides security when needed but returns to normal operation if no threat is detected after the specified number of cycles. Additionally, by only staying in the second mode for a limited number of cycles, the system can conserve power and battery life compared to continuous monitoring. This enables longer operation on a single charge. Having a configurable number of cycles enables adjusting the security timeframe as needed. For example, in highly unsecure situations, the number of cycles could be increased. Optionally, the in-vehicle security system is operative to invoke a third mode responsive to the processing resource determining that the security threat criterion is satisfied, the sensor configured in the third mode to operate at a third resolution higher than the second resolution and the first resolution. The third mode may collect sensor information only when it has been established that there is a threat worthy of such energy expenditure. The security threat criterion is a criterion indicating that it is appropriate to wake up into security mode i.e. some sensors signals indicating a threat. Therefore, the third mode enables more detailed threat scrutiny if the predefined threat criterion in the second mode are satisfied.

Optionally, the in-vehicle security system is further operative in the third mode to invoke a further sensor. The use of additional sensors to provide better records of security events.

Optionally, the further sensor is invoked responsive to user actuation. It will be appreciated that the additional sensor can be activated if the user requests it. This serves to conserve power and allows the user to select specific sensor data based on their needs in different environments.

Optionally, the further sensor is a camera. It will be appreciated that a camera sensor collects information at a higher resolution and with additional sensors allowing for more reliable and informative monitoring.

Optionally, the in-vehicle security system is further operative in the third mode to generate an alert signal responsive to determining that a sensor signal or a further sensor signal satisfies a second security threat criterion. It will be appreciated that this selective transmission approach may significantly reduce the amount of data that needs to be sent and stored compared to continuous video uploading. As a result, it may conserve network bandwidth and storage capacity. Reduced data transmission also saves energy by lowering power consumption of the dash cam and mobile device batteries. Additionally, limiting data use can decrease cellular data costs for users reliant on those connections. From a usability standpoint, selective event alerts better focus the driver's attention on pertinent incidents rather than causing alert fatigue from constant notifications.

Optionally, the alert signal is transmitted to a wireless communication device to alert a user. This signal can alert a user remotely, so that a user need not remain by the vehicle at all times but can always be aware of the security status of their vehicle regardless.

Optionally, the in-vehicle security system is further operative to invoke a fourth mode responsive to the security system detecting a security system power supply achieving a second threshold value, the fourth mode being functionally independent of the first, second and third modes and in which the further sensor is operative. The security system also is operative in a fourth mode which may be a driving mode; a mode not concerned with monitoring the security of the vehicle but adaptive to the vehicle's primary use: driving. The system is not limited to monitoring security events only but can also provide functionality when the vehicle is in motion.

Optionally, the in-vehicle security system wherein the security system invokes the three modes based on the detected power supply level. Specifically, if the security system detects the power supply has dropped below a second threshold value for a period of time that indicates the vehicle has been turned off, it will invoke either the third mode, the second mode, or the first mode. It will be appreciated that the power supply persistently decreases indicating that the vehicle is no longer being driven. The system can re-enter the state in which the security of the vehicle is monitored at a high resolution for reliable and high quality surveillance. Optionally, the system can re-enter the state in which the security of the vehicle is monitored at a lower resolution to save power whilst continuing to consider data from the sensors to detect security threats. Further optionally the system can re-enter the state in which the security of the vehicle is monitored at a lower resolution to save power whilst continuing to consider data from the sensors to detect security threats.

Optionally, when the in-vehicle security system detects the power supply has decreased below a second threshold value for a period of time indicating the vehicle was turned off, it enters the third mode. If the power supply decreases below a third threshold value, which is lower than the second threshold, the security system enters the second mode. Finally, if there is a persistent decrease in power below a fourth threshold value, lower than the third, the security system enters the first mode. The security system transitions between these three modes by monitoring decreases in the power supply relative to the different threshold values. As a result, the system is able to enter power modes based on the available power, such that the functioning of the system dynamically reacts to the battery level of the vehicle.

Optionally, the in-vehicle security system enters the third mode when it detects the vehicle's power supply has decreased below a second threshold value for a period of time that indicates the vehicle has been turned off. The security system switches to the second mode after a preset time duration in the second mode during which no sensor signals meet the threshold for a security threat. Finally, the system enters the first mode after a different preset time duration in the first mode. The system steps down through the modes as time passes without detected security threats. Suitably, this also allows the system to work symbiotically with the vehicle such that it can adapt its mode of operation responsive to the indicator that the vehicle state of charge has fallen below a certain threshold value.

Optionally, the in-vehicle security system is further operative to invoke the fourth mode responsive to the security system detecting initiation of vehicle motion based on computer vision analysis of image data captured by the further sensor. It will be appreciated that computer vision allows rapid, accurate and early detection of movement using the same camera used for security monitoring. For electric vehicles specifically, detecting motion through changes in imagery can be advantageous compared to techniques relying on voltage or current readings. As electric vehicles produce instant torque, voltage and current characteristics may not provide a clear indication of the vehicle state transition between stationary and motion. Computer vision provides a definitive detection of movement initiation that can promptly activate driving mode functions.

Optionally, the sensor is any one of: a radar sensor; a location sensor; an acceleration sensor; a sound sensor; and an infrared sensor. These different sensors enable monitoring of a variety of different conditions and factors to better assess whether an event can be considered a threat. This saves power, as higher power modes can be avoided for events that may otherwise be mistaken as relevant.

Optionally, in which the third security threat criterion is satisfied by a signal indicative of any one of or a combination of: an object moving towards the security system; the security system changing geographical location; the security system experiencing significant acceleration; and a non-typical level of noise. These different inputs enable a more intelligent consideration of whether the event being detected can be considered relevant and threatening to the security of the vehicle or not, allowing higher power modes to be avoided when the events are deemed non-threatening. The threat criterion may share indicators or at least may share outputs from the same sensors, allowing for a more compact system which better utilises the sensors available to it and saves on resources such as space, weight and materials. The third threat criterion can be tailored specifically to driving mode, and need not be limited to the same indicators of the first, second and third modes. The specific criterion to be met can be designed to specifically address driving, but this mode may still utilise the indicia of the other modes to save on resources.

Optionally, a signal indicative of: an object moving towards the security system is provided by a radar sensor; the security system changing geographical location is provided by a location sensor; the security system experiencing significant acceleration is provided by an acceleration sensor; and the security system experiencing a non-typical level of noise is provided by a noise sensor. Radar data provides specific information on how far away an object is and how fast it is moving towards the system, allowing the system to consider the likelihood that such an object may be a threat. Location sensors such as these provide specific data in a specific format which comprises specific metadata, again allowing the system to make informed assessments of whether or not an event is relevant as a security threat or not. Being able to sense atypical levels of noise may be useful in predicting that an event is about to happen, for example if a vehicle with a damaged engine is approaching or if a passenger in the vehicle pre-empts an accident.

Optionally, the motion detection module is a RADAR module and/or a LIDAR module. RADAR allows the device to operate in a lower power mode while stationary which increases the length of time such a security device can be used. Moreover, RADAR can detect the presence of an object within a perimeter security region and 'wake up' the device into a higher power state giving more functionality, such as video recording and the like.

Optionally, the acceleration sensor is one of more of: an accelerometer; a gyroscope; a magnetometer; and an inertial motion unit; and the location sensor is one or more of: a GPS sensor or a GNSS sensor; and the noise sensor is one or more of: a microphone sensor; an acoustic noise sensor; a potentiometer; a voltage sensor; an electrical noise sensor and a voltmeter. Suitably, this more efficiently utilises the power source of the vehicle as no conversion is required, and provides functionality to monitor the location, acceleration, and environment of the vehicle. Suitably, this again provides redundancy in the signals that determine the most appropriate mode of operation for the system relative to the state of the vehicle.

BRIEF DESCRIPTION OF THE DRAWINGS

One or more specific embodiments in accordance with aspects of the present invention will now be described, by way of example only, and with reference to the following drawings, in which:

FIGS. 3a, and 4b illustrate different orthographic views of a second device of the in-vehicle security system according to one or more embodiments of the present invention;

DETAILED DESCRIPTION

Figure 1:
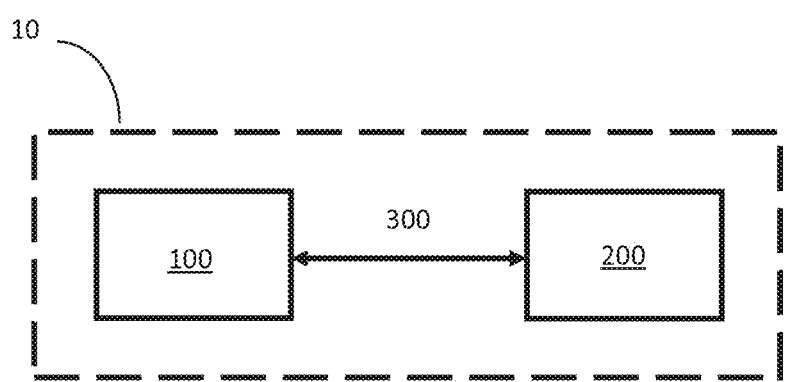
FIG. 1 illustrates a general overview of an in-vehicle security system according to one or more embodiments of the present invention.

FIG. 1 is an illustrative schematic diagram showing a general overview of a security system 10 that is for use in a vehicle such as a car, i.e. an "in-vehicle security system", according to an embodiment of the invention. It will be referred to as "security system 10" hereinafter. The security system 10 comprises a first device 100 electrically connected by a wired connection 300 to an optional second device 200. The wired connection 300 is a removeable electrical connection meaning that the first device 100 and the second device 200 can be removably connected to each other.

The wired connection 300 between the first device 100 and the second device 200 comprises an electro-mechanical coupling, mechanical at least in so much as the wireless connection is terminated with an electrical connector mechanically engageable with respective devices 100, 200, for example by way of friction between connection pins and corresponding sockets, to permit the transfer of data and power between the devices. When coupled to the first device 100, the second device 200 receives power from the first device 100 via the electro-mechanical coupling 300 and can transfer data that it captures to the first image 100 via the electro-mechanical coupling 300.

The security system 10 in general comprises one or more sensors capable of video recording, audio recording, acceleration sensing and radar detection in a single "aftermarket" system which can be retro fitted into a vehicle. The sensors that are used to achieve such capabilities are configured to capture the respective data from within the vehicle (for example the cabin) and from the exterior region around the vehicle. Such an exterior region may extend for several metres away from the exterior surface of the vehicle in order to monitor its immediate environment similar to a security perimeter region. The extent of the exterior region is a matter of design choice but the skilled person should take into account a sufficient extent to detect potential threats to the vehicle but minimising false positives due to the normal movement, such as pedestrian, cyclist or other vehicle traffic, of objects that may be passing the vehicle.

In this regard, the exterior region may extend for up to several metres from the vehicle body. For example, the exterior region may extend up to around 1 m if only the close proximity of the vehicle is to be monitored such as when the vehicle is parked in a road and other vehicles and pedestrians are likely to be passing by; optionally, in an environment in which there is likely to be less passing vehicle or pedestrian traffic such as in a car park and exterior region extending up to 2 m to 3 m or thereabouts would be suitable. If the car is left a stationary and in an open area a great exterior region such as extending beyond 3 m to 10 m or even a greater number of metres may be suitable.

First Device 100

Figure 2A:
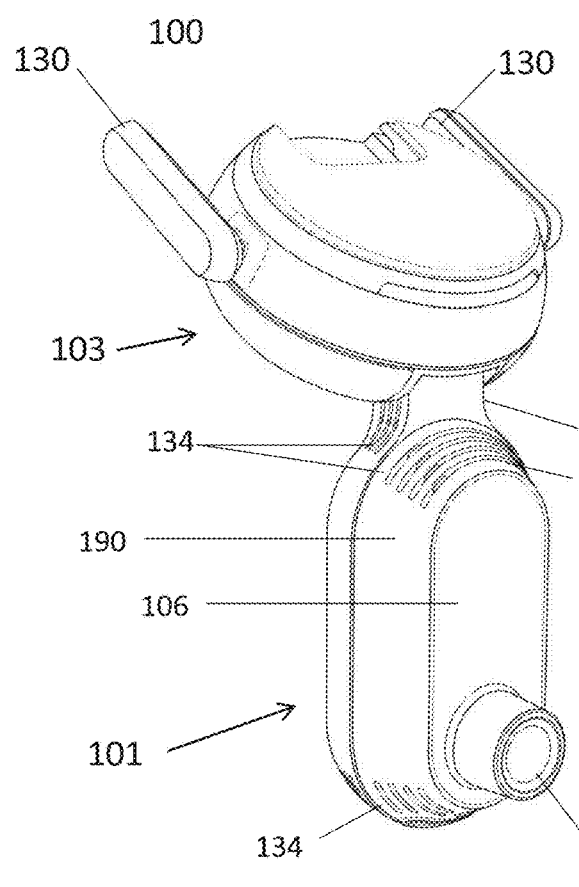
FIGS. 2a, 2b, and 2c illustrate different orthographic views of a first device of the in-vehicle security system according to one or more embodiments of the present invention.
Figure 2B:
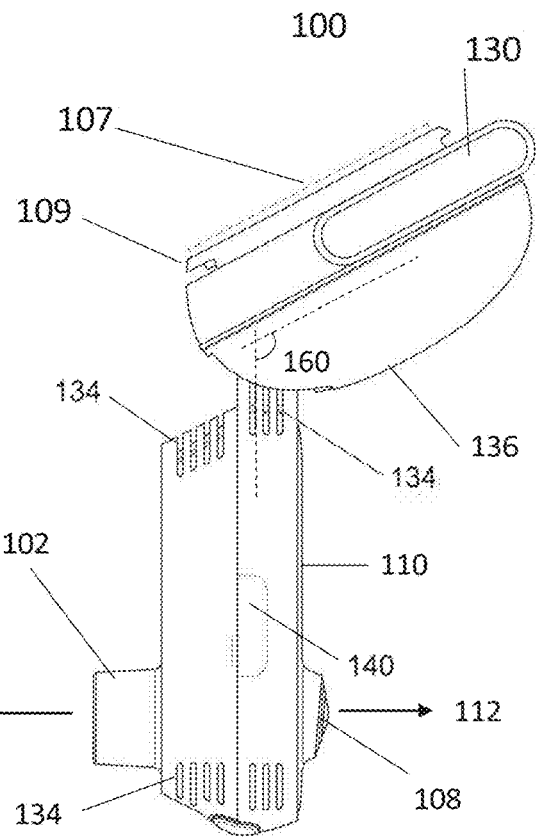
Figure 2C:
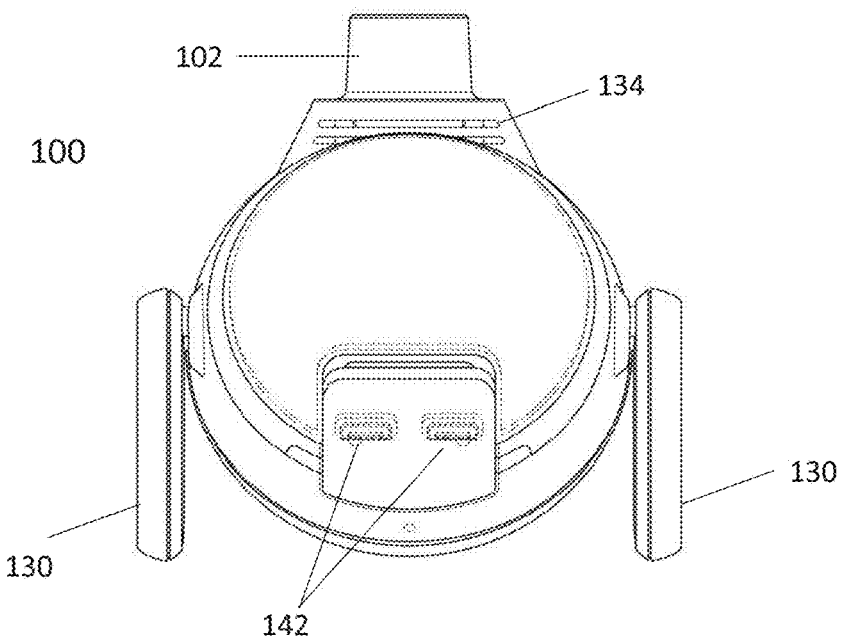

FIGS. 2a, 2b, and 2c are illustrative line drawings showing external elements of the first device 100 when viewed from different perspectives, according to an embodiment of the invention. The first device 100 is described with reference to these figures.

The first device 100 is a dashcam type device that is comprised of a lower, pendant portion 101 which is pivotably coupled by a connection point 105 to a circular mounting end 103. The mounting end 103 of the device 100 is configured to be fixed to a windscreen of a vehicle (not shown in these figures) with the angle adjustment of the pendant portion 101 achieved by pivoting about a connection point 105. The mounting portion 103 can be affixed to a windscreen by a sticky pad 107, such as a 3M™ sticky pad. The sticky pad 107 is generally considered non-removable, but if a user desires to remove the first device 100, they may do so by way of the removable section 109 of the mounting end 103. The first device 100 can be released or decoupled from the removable section 109 by a sliding motion (not shown) which leaves the sticky pad 107 fixed to the windscreen.

The mounting end comprises the components that requires good view of the sky above the vehicle, such as a 4G/LTE module and a GPS module.

When in use, the pendant portion 101 is maintained such that a first image capture device 102 is facing the horizon in a direction 104 towards the external area in front of the vehicle to which it may be mounted. The inclination angle of vehicle windscreens is known to vary depending on the vehicle. For example, busses and lorries are likely to have an inclination angle close to 90 degrees relative to the ground, whereas cars, and especially sports cars will be around 45 degrees to 70 degrees. To accommodate for this variation, the pivot angle 160 between the pendant portion 101 and the mounting end 103 can move in a range of 90 degrees. One extreme is where the front face 106 of the first device 100 is substantially parallel to the plane of the sticky pad 107; the other being when the front face 106 of the first device 100 is perpendicular to the plane of the sticky pad 107 (i.e., the angle α shown in FIG. 2b is approximately the midpoint of the 90 degree range.

The pivotable nature of the pendant portion 103 relative to the mounting portion/end 103 permits the device 100 to be mounted in a wide range of different vehicles while maintaining good visibility of the horizon of the external area in front of the vehicle.

As previously mentioned, the first device 100 is a dashcam device that comprises a first image capture device 102 (sometimes referred to as "first camera 102") on the front face 106 of the device 100 and faces a first direction 104 away from the front face 106 towards the external area in front of a vehicle which may be mounted. The first camera 102 is capable of recording image data and video data up to 4K resolution and in the direction 104 with a field of view of 125 degrees.

The first device 100 additionally comprises a second image capture device 108 (sometimes referred to as "cabin camera 108" or "second camera") which is located on the rear face 110 of the device 100 and faces the second direction 112. The cabin camera 108 generally faces toward the inside 112 of the vehicle in which it is mounted. The cabin camera 108 is a wide-angle, 1440P resolution lens with a field of view of approximately 190 degrees which enables image capture and video recording of the cabin as well as the external area to the sides of the car (as indicated by arrows 94 in FIG. 2). As can be seen in FIG. 2b, the cabin camera 108 is angled downwardly with respect to the axis of the first camera 102. The cabin camera 108 is located towards the lower end of the pendant portion 101 (i.e., at a point furthest away from the mounting end 103) so as to be as close to the centre of the windscreen as possible while not occluding the field of view of the driver. The effect of positioning the cabin camera 108 as far down in the vertical direction as possible is to ensure that its field of view is not occluded by the rear-view mirror of the vehicle. Additionally, the lower the position of the cabin lens 108, the wider the field of view outside of the vehicle can be. This is due to the fact that the field of view will not be occluded by the framework of the side doors thus allowing the device 100 to capture images and video of a person approaching the side of the vehicle. It will of course be appreciated that increasing the coverage of the sides of the cabin area, i.e., the doors and side windows, will improve the ability of the security device to detect and record the presence of someone trying to break into the vehicle via those routes.

As will be appreciated, the figures show the external lens or external lens tube of the first image capture device 102 and the second image capture device 106 only. As part of the two image capture devices, there will be other components not shown in the diagrams such as a digital image capture sensor, focusing elements such as lenses, filters, and other optical elements. Examples of digital image capture sensors that may be used are CCD chips or CMOS sensors.

The first device 100 also comprises one or more air vents 134 to facilitate the ingress and egress of air into the device housing as a form of convective heat management. Other or additional forms of heat management within the first device 100 may be heat sinks or cooling fins (not shown).

In some embodiments, there may also be a speaker 136 located in the mount portion 103 capable of speech over the background noises while the vehicle is in motion to provide warnings to a person located in the vehicle, or to a would-be intruder. The first device may also comprise a memory card slot 140 to allow removable insertion of electronic data storage devices, such as SD™ cards, flash memory cards, or other electronic data storage devices.

Second Device 200

FIGS. 3a and 3b are illustrative schematic line drawings showing external elements of the second device 200 when viewed from different perspectives, according to one or more embodiments of the invention. The second device 200 of the security system 10 is described with reference to these figures.

As mentioned in the description of FIG. 1, the second device 200 is an optional auxiliary device that is in a wired electrical connection with the first device 100. The second device 200 comprises a lozenge shaped portion 400 that is pivotably connected to a circular mount portion 402. The mount portion 402 is similar to the circular mounting end 103 of the first device 100; it comprises a sticky pad portion 406 to affix the mount to a support structure, such as a rear windscreen (not shown). The lower, lozenge portion 400 is moveable relative to the mount portion to allow a user to adjust the field of view accordingly. The movement is provided by a 'ball and socket' joint 408, which is substantially similar to the arrangement described in UK patent application numbers GB2582140A1 and GB2581850A1, and UK patent publication number GB2581851B1.

The second device comprises a third image capture device 410 (sometimes referred to as "the third camera 410" or "rear facing camera") which is capable of capturing images and recording video. When mounted in a vehicle, the third image capture device 410 faces a direction 92 towards an external area at the rear of the vehicle (as seen in FIG. 2). Thus, it provides a view towards the rear of the vehicle. In one embodiment, the image capture device 410 has 1440P resolution with a field of view of 125 degrees.

As mentioned in relation to FIG. 1, the second device 200 is removably connectable to the first device 100 by way of a wired connection. This can be seen in truncated form in FIG. 3b as indicated by reference numeral 300.

When connected to the first device 100, the first camera 102, the cabin camera 108, and the third camera 410 form a multi-directional camera assembly providing views substantially around the entire external area and within the cabin area of the of the vehicle in which it may be mounted, i.e., a 360-degree range around the vehicle. Images and videos captured on the rear camera device can be transferred to the front device via the wired connection 300 for storing and further processing.

Security System Components

Figure 4:
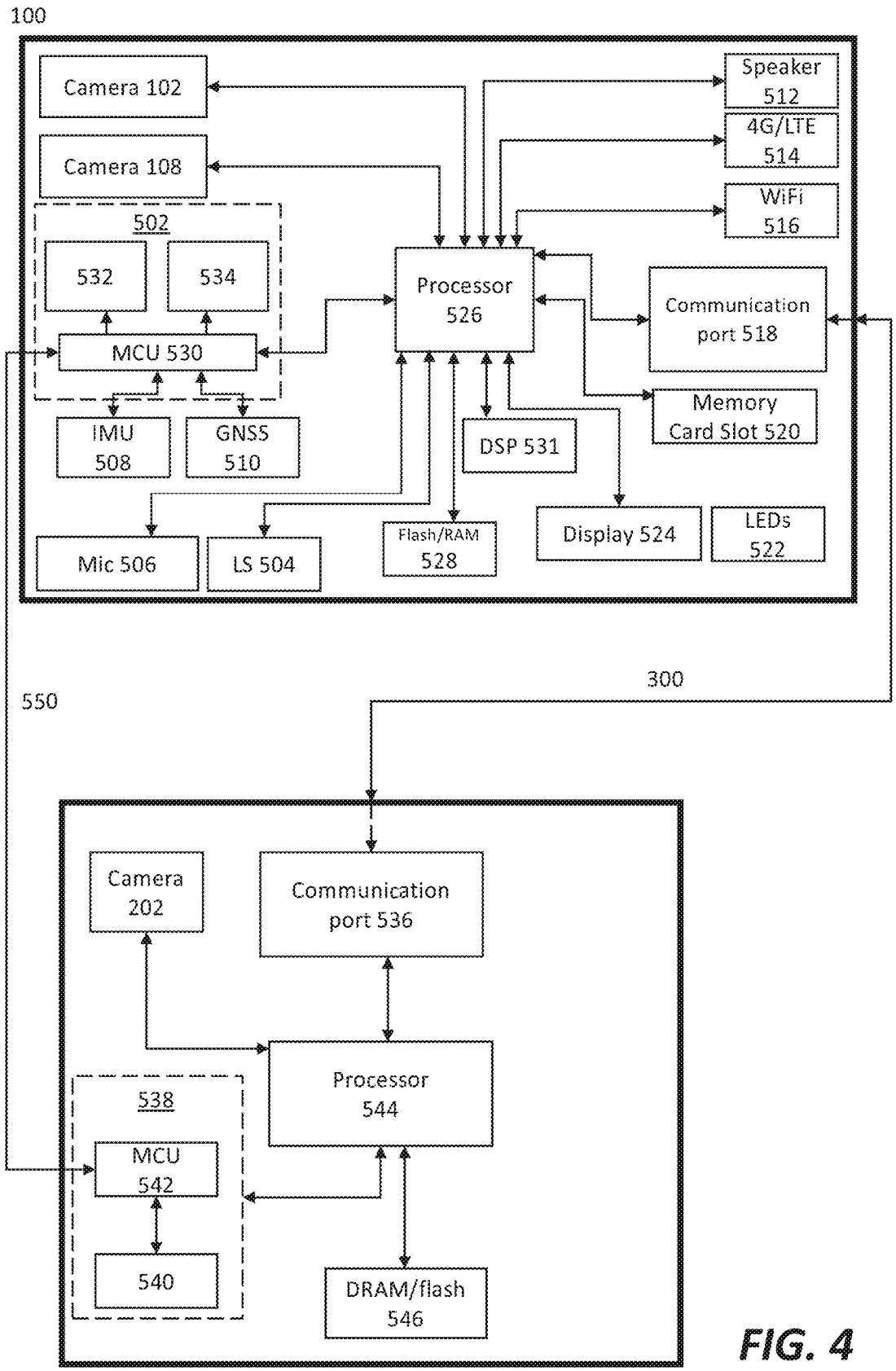
FIG. 4 is an illustrative block diagram of a first device and a second device of an in-vehicle security system according to one or more embodiments of the present invention.

FIG. 4 is an illustrative block diagram showing the internal and external components of the security system 10 in more detail. In the figures the arrows indicate the data and or power connection between the components. As previously described with reference to FIG. 1, the security system 10 comprises the first device 100 and the second device 200.

In a general overview, the lefthand side of FIG. 4 comprises the input components/sensors of the first device 100. In this embodiment, the first device comprises the front camera 102, the rear camera 108, a motion detection and ranging module 502, a light sensor 504, a microphone unit 406, an inertial measurement unit (IMU) 508, and a global navigation satellite system (GNSS) receiver 510. The output components/interfaces are shown on the righthand side of FIG. 4, comprising but not limited to: a speaker output 512, 4G/LTE module 514, a WiFi module 516, a communication port 518, removable memory card slot 520, and LEDs 522. The first device additionally comprises various internal components such as a processor 526, an internal memory 528 such as RAM or FLASH, and a digital signal processor (DSP) 531.

The motion detection and ranging module 502 additionally comprises a microcontroller unit (MCU) 530 which is in electrical connection with the processor 526, the IMU 508, and the GNSS receiver 510. The MCU 530 controls a first radar unit 532 and a second radar unit 534, both of which are designed to detect motion, speed, angle, and location of an object exterior to the vehicle to which is the first device 100 is mounted. Each of the first radar unit 532 and the second radar unit 534 ("radar units") both comprise one radar transmitter and two radar receive antennas (not shown). The radio transmitter of each radar unit operates at 24 GHz and uses triangular chips on linear frequency modulation (commonly called LFMCW) to allow for accurate radial distance measurements. The two radar receive antennas in each of the radar units are situated in different spatial locations of the first device 100 so as to provide sufficient parallax between respective pairs of radar receivers. This allows the radar units to be able to detect the distance of an object. Additionally, the two receive antennas allow for phase difference angle estimation, which in-turn will provide sufficient data resolution to generate a 2D plot around the vehicle (see example shown in FIGS. 8 and 9, which is described in more detail below).

The IMU 508 is used to detect movement of the vehicle when stationary or when it is driving. When stationary, the IMU 508 can detect motion of the vehicle such as when a person is attempting to break into the vehicle or lift if up to remove valuable components underneath the vehicle. The advantage of this is that the security device could be in a low power mode while stationary so as to conserve energy usage (i.e., not activating the video devices/cameras) but be 'woken' if the IMU 508 detects movement. Once the security device detects a movement of the vehicle, the cameras and object detection, which consume much higher power, could be activated to record the event. Another option is that while in a lower power mode, the radar antennas could be operated to provide object detection around the vehicle which is then transmitted to a remote user device via a 4G connection upon the IMU 508 detecting movement. This would be indicative of a security threat.

The radar antennas can be seen in FIG. 2a, FIG. 2b, and FIG. 2c indicated by numeral 130 and are movable so as to provide flexibility depending on mounting conditions. For example, they may be rotated 90 degrees to accommodate objects such as rear-view mirrors and the like. The distance between the two antennas is set depending on the frequency of the transmitters. In some embodiments the distance is 60 mm so as to enable large enough ground plane to ensure optimal performance.

Figure 6:
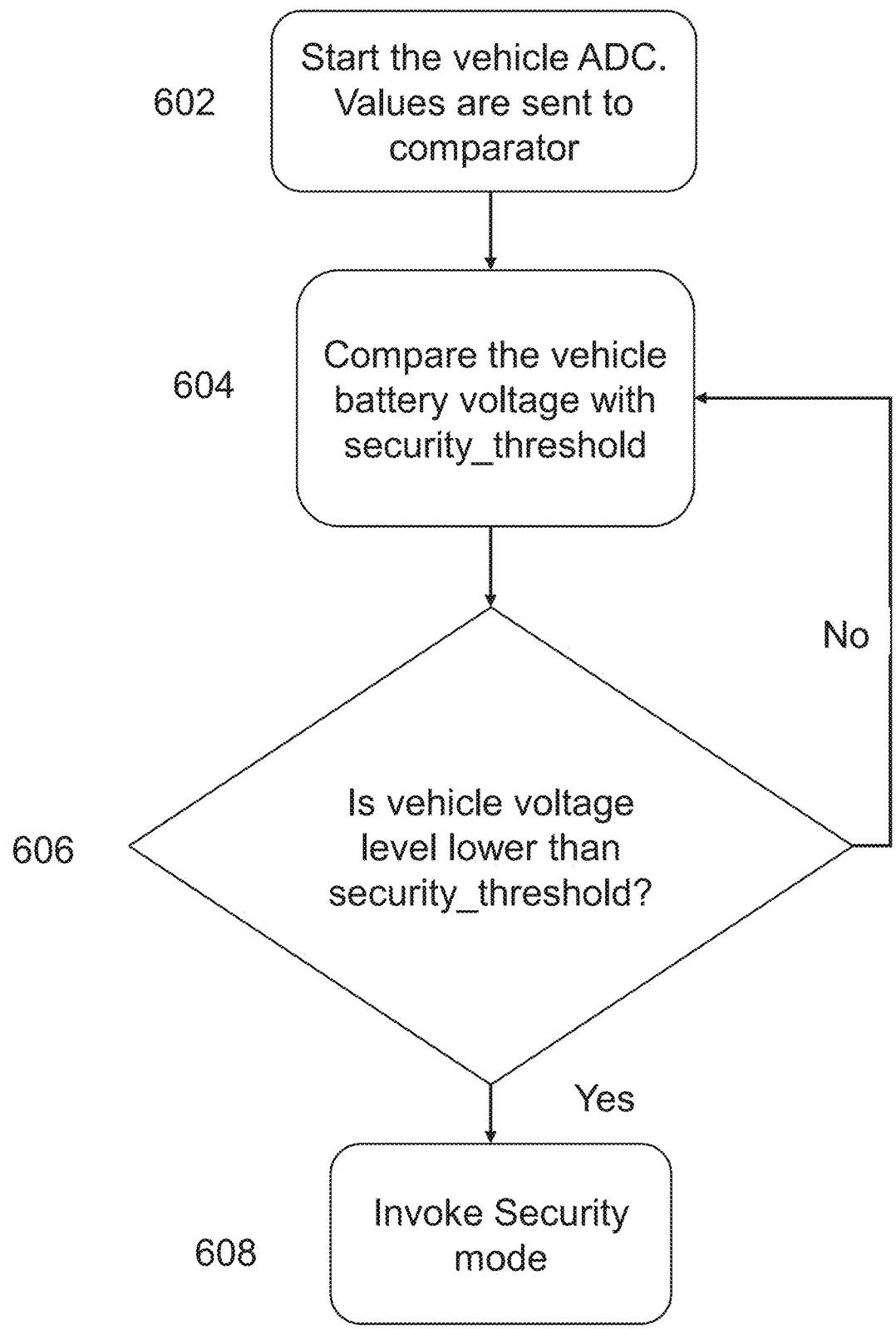
FIG. 6 is a flow diagram of the in-vehicle security system being triggered to enter Security mode according to one or more embodiments of the present invention.

The first device 100 is connected via the communication port 518 by wired connection 300 to a similar communication port 536 on the second device 200 (as seen in FIG. 6). The wired connection is indicated by the line 300 between FIG. 4 and FIG. 6 and can also be seen in FIG. 3a and FIG. 3b. In the example of this embodiment, the second device is connected to the first device via a USB connection (seen as 142 on FIGS. 2a-c).

Similar to the first device 100, the second device 200 of the security system 10 also comprises a motion detection and ranging module 538. The module 538 further comprises the radar module 540 which is controlled by an MCU 542. The third radar module 540 assists in providing a 360-degree motion detection and ranging coverage around the entire vehicle (see example shown in FIG. 7, which is described in more detail below). In general use, the second device is controlled by a processor 544 but when in a stationary, lower power mode, the MCU 542 controls the radar module 540 via a communications channel 550. The communication channel 550 may be part of the wired connection 300. In this embodiment, the MCU 542 directly communicates to the MCU 530 while in any low power mode so as to "wake up" the security system if any motion is detected.

The third radar module 540 also comprises one radio transmitter and two radio receiver antennas (not shown in this image) that are similar to the ones described in relation to FIG. 4 and motion detection and ranging module 502.

Additionally, the second device 200 comprises an internal memory 546 such as DRAM or FLASH.

Operation Modes

In some embodiments, the system is operative in a variety of modes. These modes are one or more of: Driving Mode; Security Mode; Low Power Security Mode; Very Low Power Security Mode; System Update Mode; Powerdown Mode; Low Voltage Mode or others. These modes may be distinguished by: power consumption; sensors invoked; function performed; data collected; data transmitted; modules invoked and/or other factors.

In some embodiments, the invocation of each mode is triggered by events such as: detection of the vehicle battery voltage level exceeding a particular threshold value; detection of the vehicle battery voltage level exceeding a particular threshold value for a particular duration of time; detection of the vehicle battery voltage level declining below a particular threshold value for a particular duration of time; detection of the vehicle battery voltage level declining below a particular threshold value; detection of an acceleration exceeding a particular threshold value; an indication of movement detected by at least one camera image sensor; detection of a change of location data exceeding a particular threshold value; detection of movement exceeding a particular threshold value by at least one radar sensor; detection of sound exceeding a particular threshold value; a prespecified invocation of a particular mode based on time; detection of vehicle initiation and/or cessation through computer vision; a manual invocation of a particular mode by a user via an interface such as a graphical user interface (GUI) or others or a combination of the above.

In some embodiments, each mode utilises specific combinations of sensors operating at different resolutions configured to be triggered by traversing, meeting or falling below different thresholds in order to balance appropriate power consumption with appropriate functionality depending on what may be happening around the vehicle. In some embodiments, Driving mode invokes sensors that are configured to detect events that are of interest whilst the vehicle is in motion and enables relatively high-power consumption by these sensors as the vehicle battery is commonly being supported by the vehicle alternator during periods of driving.

In some embodiments, Security mode invokes sensors that are configured to detect events that are of interest whilst the vehicle is not actively being driven and enables relatively high-power consumption by the system despite the lack of support by any charging means in order to provide a high-quality record of events considered relevant to the surveillance of the vehicle.

In some embodiments, Low Power Security Mode utilises sensors relevant to providing a record of the surveillance of the vehicle whilst it is not being driven and may operate fewer of the sensors compared to Security mode and may operate these sensors at a lower resolution to reduce the power consumption of the system. A 'lower resolution' in some embodiments may refer to operating a camera sensor with less detail and clarity; an audio sensor running at lower resolution may record with less fidelity reducing the bit rate and sampling frequency compared to operating the audio sensor at a higher resolution amongst others.

In some embodiments, Very Low Power Security Mode provides this same functionality at an even lower power consumption owing to the operation of the sensors at an even lower resolution. In this way, the security system 10 is able to adapt to the requirements of the vehicle as the environment and use of the vehicle changes.

In an illustrative embodiment, the security system 10 comprises a voltage sensor comprised of a comparator, ADC (analogue to Digital Converter), DAC (Digital to Analogue Converter) and processor. The comparator is provided a value from the memory 528/520 and another from the ADC. The ADC obtains this value by converting the voltage at the vehicle battery to a digital value which is in turn then fed to the comparator. The result found by the comparator prompts the processing means to invoke different operation modes. The voltage sensor continually monitors the vehicle electrical power supply state of charge. The voltage sensor may be connected to the main electronic loom of the vehicle such that it may take readings of the electrical energy available to the vehicle's electrically powered devices. Whilst the engine is running and engaging the alternator, these readings will show the electrical power made available by the alternator and/or the vehicle battery. Whilst the engine is off and the alternator is not engaged, these readings will show the electrical power made available by the vehicle battery alone. In some embodiments, the system is connected to the electrical system of the vehicle by a pre-existing electrical port, such as the OBD-II port, USB ports, USB-C ports, auxiliary power outlets and/or others.

In some embodiments, the system operates on voltages between 12V to 24V. Optionally, the system operates on voltages between 20V to 24V. Optionally the system operates on voltages between 21V to 24V. Optionally the system operates on voltages between 22V to 24V. Optionally the system operates on voltages between 23V to 24V.

In some embodiments, whilst the system is in Driving Mode and Security Mode, continuous sampling of the available electrical power by the voltage sensor is performed. In Low Power Security Mode, Very Low Power Security Mode, Low Voltage mode and Update mode, this sampling is performed periodically. In some embodiments, the available electrical power of the vehicle whilst the system is in Low Power Security Mode, Very Low Power Security Mode, Low Voltage mode and Update mode is oversampled. In some embodiments, the available electrical power of the vehicle whilst the system is in Low Power Security Mode, Very Low Power Security Mode, Low Voltage mode and Update mode is oversampled at a rate of 16 Hz.

In some embodiments, Driving Mode may invoke the use of the following sensors: at least one camera image sensor; at least one location sensor; at least one IMU; at least one modem; at least one microphone; and other sensors. In Driving Mode, the sensors may be operated such that the data they collect is high resolution. From this point onwards, high resolution can be considered 1440p for the camera sensors; 16 KHz for the microphone; 10 Hz for the location sensor; and 416 Hz for the IMU sensor. In some embodiments, in Driving Mode, the thresholds at which these sensors are triggered are complex since once an event of interest is detected, the sensor data surrounding this event is committed to memory 528/520, the capacity of which of course is limited, so effective detection of relevant events is important. Driving mode will be invoked when the comparator discerns an increase in the vehicle voltage above a certain value stored in memory 520/528. This value is referred to as driving threshold. In some embodiments, Driving Mode invokes the use of at least three camera image sensors.

Figure 5:
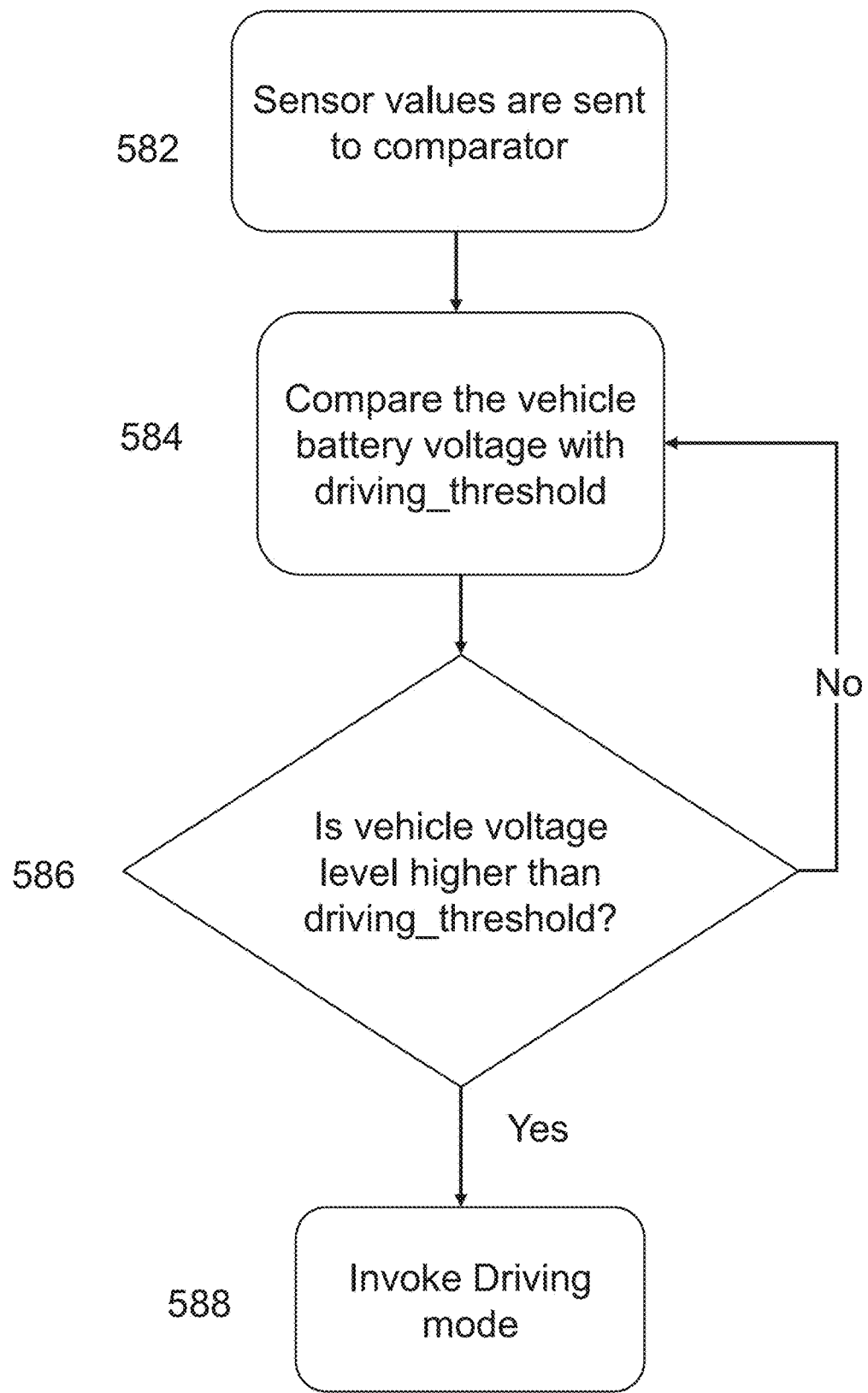
FIG. 5 is a flow diagram of the in-vehicle security system being triggered by an increased voltage to enter Driving mode according to one or more embodiments of the present invention.

FIG. 5 shows a mechanism by which security system 10 invokes Driving mode. In Step 582, the vehicle ADC is started and the resulting values are sent to the comparator. In step 584, the comparator then compares these collected values with the value stored in memory 520/528 driving_threshold. At decision 586, if the vehicle voltage level is found by the comparator to be higher than driving_threshold, the system proceeds to step 88. If not, the system returns to step 584 and compares the vehicle voltage levels provided by the ADC to the comparator. In step 588, Driving mode is invoked, in which certain sensors at particular resolutions are engaged. In some embodiments, the process of steps 582 to 586 is repeated every 500 ms.

In an illustrative embodiment, Security Mode invokes the use of the following sensors: at least one camera image sensor; at least one radar sensor; at least one IMU; at least one modem; at least one location sensor; and other sensors. In Security Mode, the sensors may be operated such that the data they collect is high resolution. In some embodiments, high resolution is 16 Hz for the radar sensors. In Security Mode, the thresholds at which these sensors are triggered are complex since once an event of interest is detected an alert signal is sent to an external device such as a mobile device or the like via the 4G/LTE module 514 requiring larger amounts of power, so effective detection of relevant events is important. Only events considered to have qualified as a threat by satisfying a second security criterion produce an alert to a user. It will be appreciated that this selective transmission approach significantly reduces the amount of data that needs to be sent and stored compared to continuous video uploading. As a result, it conserves network bandwidth and storage capacity. Reduced data transmission also saves energy by lowering power consumption of the dash cam and mobile device batteries. Additionally, limiting data use can decrease cellular data costs for users reliant on those connections. From a usability standpoint, selective event alerts better focus the driver's attention on pertinent incidents rather than causing alert fatigue from constant notifications. In some embodiments, certain sensors operative in Security mode are invoked responsive to user actuation. In some embodiments, a camera sensor is activated in Security mode responsive to user actuation.

In some embodiments, the security system provides alerts to a user using means such as sounding an audible alarm within a vehicle or triggering an external alarm system.

In some embodiments, Security mode is invoked when the comparator discerns a decrease in the vehicle voltage below a certain value stored in memory 520/528. This value is referred to as security_threshold. In an illustrative embodiment, this decrease below security_threshold must be sustained for a duration of time before Security Mode is invoked. In some embodiments, this duration of time is 1 minute.

FIG. 6 shows a mechanism by which security system 10 invokes Security mode in which the voltage sensor may monitor the electrical energy available to the vehicle's electrical devices to detect that the vehicle battery is no longer being charged by the alternator and that the engine has been disengaged. In Step 602, the vehicle ADC is started and the resulting values are sent to the comparator. In step 604, the comparator then compares these collected values with the value stored in memory 520/528 security_threshold. At decision 606, if the vehicle voltage level is found by the comparator to be lower than security_threshold, the system proceeds to step 98. If not, the system returns to step 604 and compares the vehicle voltage levels provided by the ADC to the comparator. In step 608, Security mode is invoked, in which certain sensors at particular resolutions are engaged. In some embodiments, the process of steps 602 to 606 are repeated every 50-1000 ms (milliseconds).

In an illustrative embodiment, Low Power Security Mode may invoke the use of the following sensors: at least one radar sensor; at least one modem; at least IMU; at least one camera image sensor; at least one LTE receiver. In Low Power Security Mode, the sensors may be operated such that the data they collect is at a second low resolution which is lower than in Security or High Power Mode. In some embodiments, this second low resolution is 10 Hz for the location sensor; 8 Hz for the radar sensors; and 416 Hz for the IMU sensor. In Low Power Security Mode, the thresholds at which these sensors are triggered are such that very little processing power is required.

In some embodiments, Low Power Security mode will be invoked when the comparator determines a decrease in the vehicle electrical power supply below a certain value stored in memory 520/528. This value is referred to as LP_security_threshold. In an illustrative embodiment, this decrease below LP_security_threshold must be sustained for a duration of time before Low Power Security Mode is invoked. In some embodiments, this duration of time is 1 minute. In some embodiments, Low Power Security mode is invoked after a certain period of time in which the system receives no sensor signals that satisfy a threat criterion. In some embodiments, this period of time is 15 seconds. In some embodiments, this period of time is set by a user.

In some embodiments, Low Power Security mode is maintained until a security threat criterion is satisfied indicating that the system should enter Security mode. In some embodiments, Low Power Security mode is maintained responsive to the processing resource of the system 526 determining a system condition is satisfied. In some embodiments the system condition is expiry of a first system time duration or a specific duration of time whilst no sensors signals are received. In some embodiments, this specific first system time duration is between 50 to 1000 milliseconds. In some embodiments, this specific first system time duration is stored in memory 520/528. In some embodiments, this first system time duration is set by a user.

In some embodiments, the system maintains Low Power Security mode until a set number of security threat criterion cycles have occurred. A security threat criterion cycle refers to one complete epoch or period of time where the system evaluates whether any received signals satisfy the pre-defined security threat criterion. If no security threats are detected during the cycle, the system proceeds to the next iteration to continue monitoring. In some embodiments, this number of security threat criterion cycles is 3. In some embodiments, this number of security threat criterion cycles is stored in memory 520/528. In some embodiments, this number of security threat criterion cycles is set by the user via a user interface or settings menu.

Figure 7:
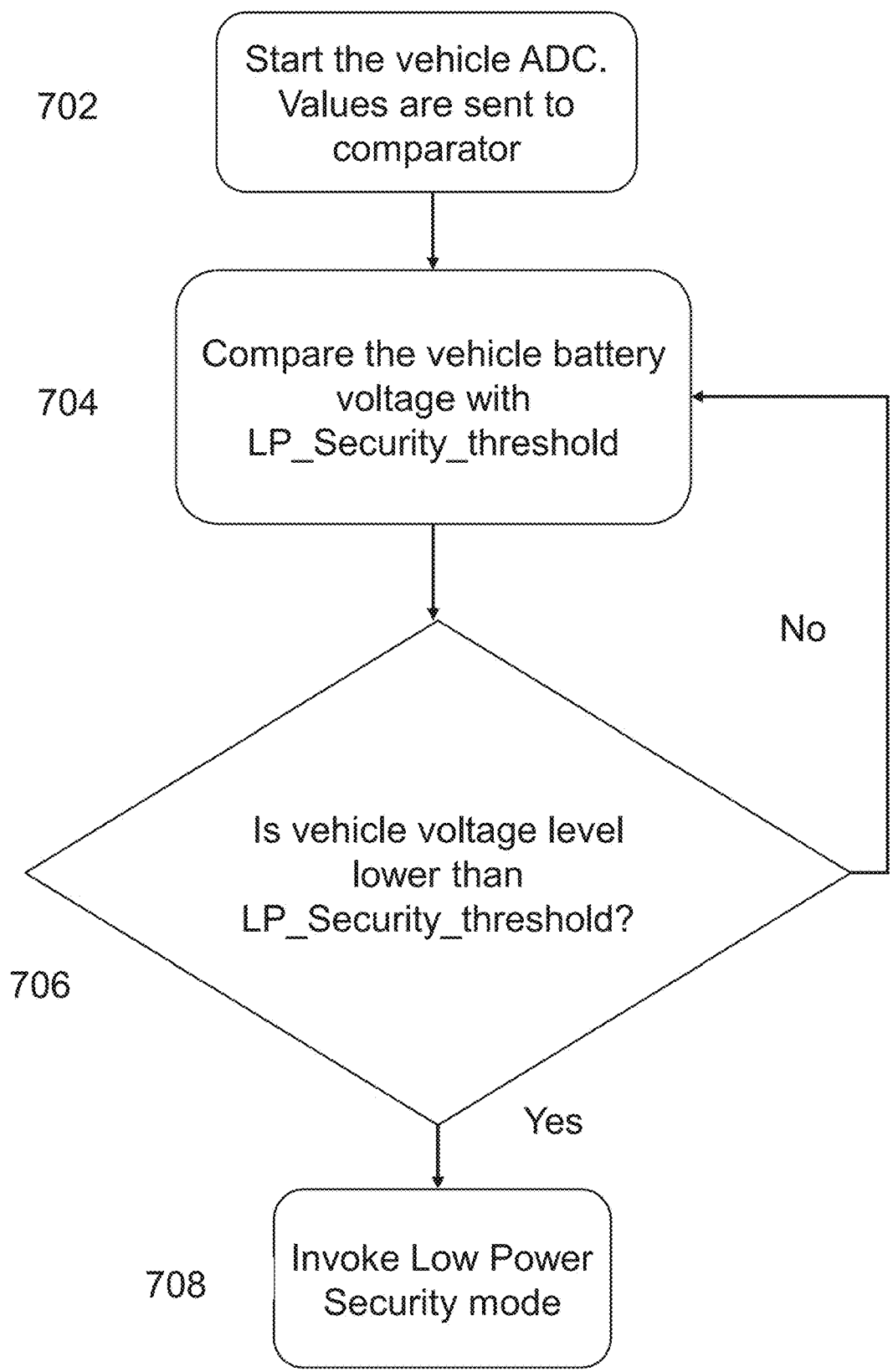
FIG. 7 is a flow diagram of the in-vehicle security system being triggered to enter Low Power Security mode according to one or more embodiments of the present invention.

FIG. 7 shows a mechanism by which security system 10 invokes Low Power Security mode. In Step 702, the vehicle ADC is started and the resulting values are sent to the comparator. In step 704, the comparator then compares these collected values with the value stored in memory 520/528 LP_security_threshold. At decision 706, if the vehicle electrical power supply is found by the comparator to be lower than LP_security_threshold, the system proceeds to step 708. If not, the system returns to step 704 and compares the vehicle voltage levels provided by the ADC to the comparator. In step 708, Low Power Security mode is invoked, in which certain sensors at particular resolutions are engaged. In some embodiments, the process of steps 702 to 706 are repeated every 50-1000 ms.

In an illustrative embodiment, Very Low Power Security Mode invokes the use of the following sensors: at least one radar sensor; at least one modem; at least one location sensor; at least IMU; at least one LTE receiver. In some embodiments, when the system is in Very Low Power Security Mode, the sensors are operated such that the data they collect is at a third low resolution which is lower than in Low Power Security Mode. In some embodiments resolution refers to frequency of operation. In some embodiments, this third low resolution is; 8 Hz for the radar sensors; and 416 Hz for the IMU sensor. In Very Low Power Security Mode, the thresholds at which these sensors are triggered are very basic in order to reduce any processing power required.

In some embodiments, Very Low Power Security mode will be invoked when the comparator determines a decrease in the vehicle voltage below a certain value stored in memory 520/528. This value is referred to as VLP_security_threshold. In an illustrative embodiment, this decrease below VLP_security_threshold must be sustained for a duration of time before Very Low Power Security Mode is invoked. In some embodiments, this duration of time is 30 seconds. In some embodiments, Very Low Power Security mode is invoked after a specific duration of time in which the system, operating in Low Power Security mode, receives no sensors signals that satisfy a threat criterion. In some embodiments, this specific period of time is 50-1000 milliseconds (ms). In some embodiments, this specific period of time is stored in memory 520/528. In some embodiments, this specific period of time is set by a user. In some embodiments, the system maintains Low Power Security mode until a set number of security threat criterion cycles have occurred. A security threat criterion cycle refers to one complete epoch or period of time where the system evaluates whether any received signals satisfy the pre-defined security threat criterion. If no security threats are detected during the cycle, the system proceeds to the next iteration to continue monitoring. In some embodiments, this number of security threat criterion cycles is 3. In some embodiments, this number of security threat criterion cycles is stored in memory 520/528. In some embodiments, this number of security threat criterion cycles is set by the user via a user interface or settings menu.

Figure 8:
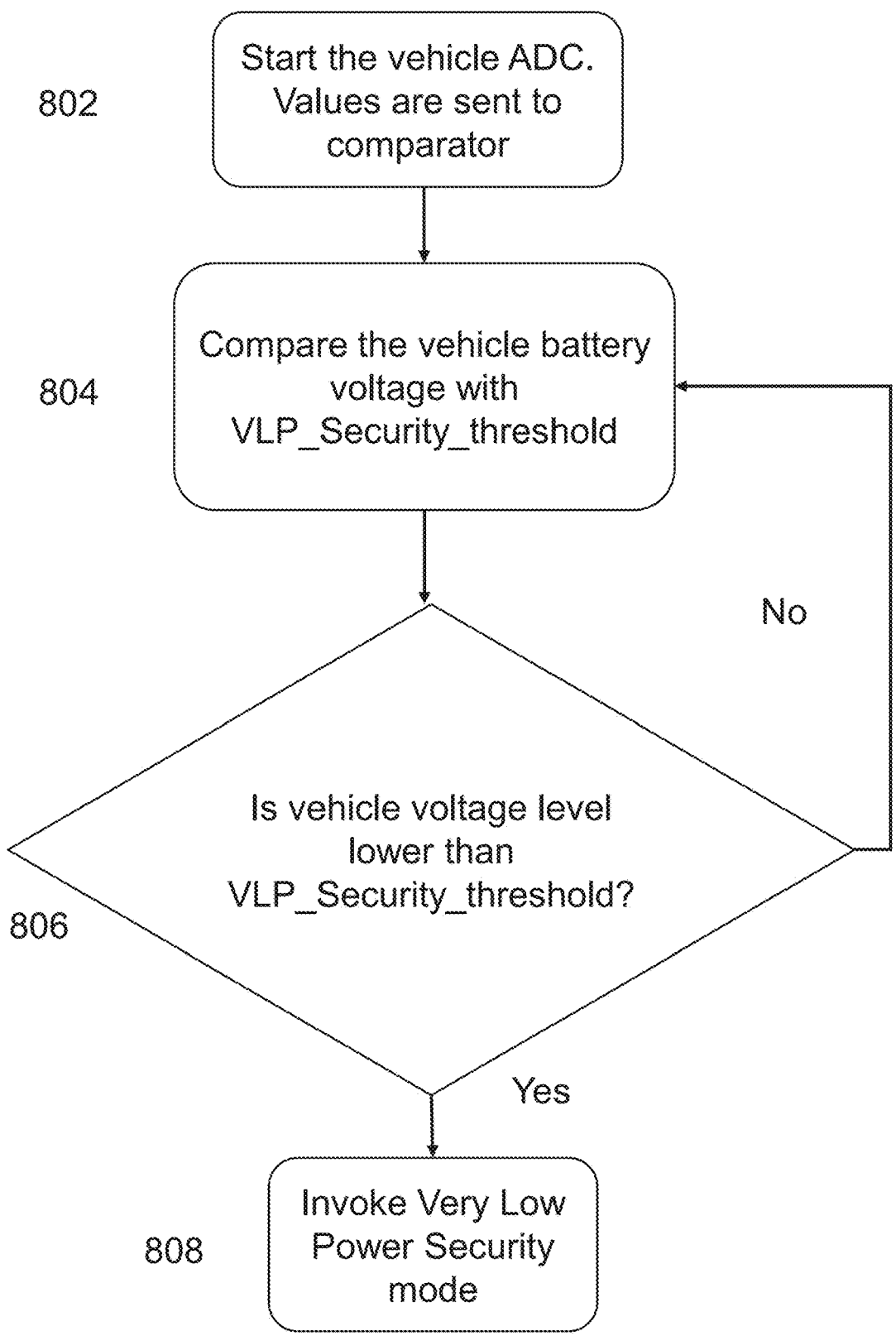
FIG. 8 is a flow diagram of the in-vehicle security system being triggered to enter Very Low Power Security mode according to one or more embodiments of the present invention.

FIG. 8 shows a mechanism by which security system 10 invokes Very Low Power Security mode. In Step 802, the vehicle ADC is started and the resulting values are sent to the comparator. In step 804, the comparator then compares these collected values with the value stored in memory 520/528 VLP_security_threshold. At decision 806, if the vehicle voltage level is found by the comparator to be lower than VLP_security_threshold, the system proceeds to step 808. If not, the system returns to step 804 and compares the vehicle voltage levels provided by the ADC to the comparator. In step 808, Low Power Security mode is invoked, in which certain sensors at particular resolutions are engaged. In some embodiments, the process of steps 802 to 806 are repeated every 500 ms.

In an embodiment, security_threshold, LP_security_threshold, and VLP_security_threshold are the same value. In an embodiment, the security_threshold, LP_security_threshold, and VLP_security_threshold may be user-configurable and stored in a system memory, allowing the user to customize the systems sensitivity.

Figure 9:
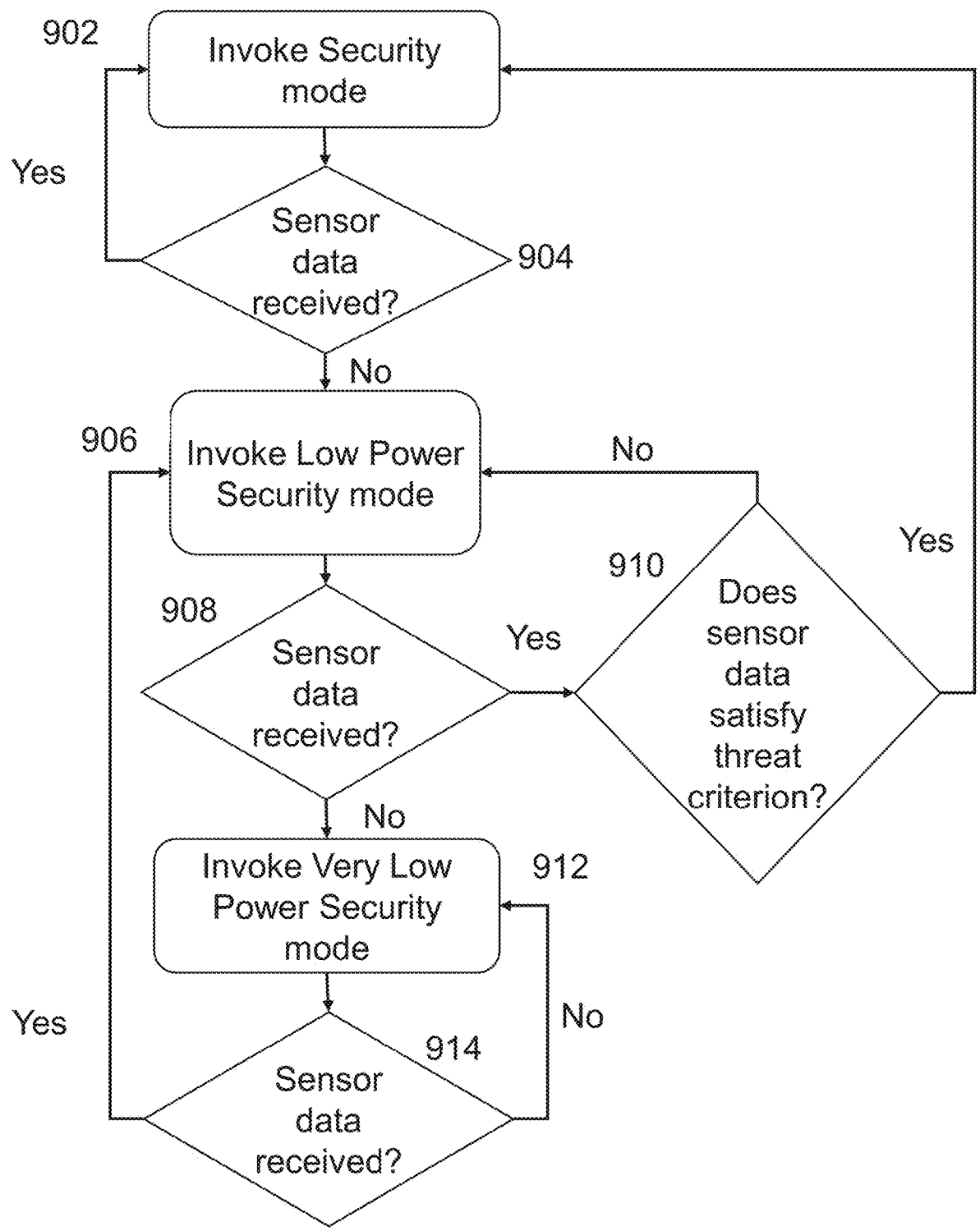
FIG. 9 is a flow diagram of the in-vehicle security system moving between Security mode, Low Power Security mode and Very Low Power Security mode according to one or more embodiments of the present invention.

FIG. 9 is an illustrative embodiment of how the system manages power in the various security modes. In step 902, Security mode is invoked. At decision 904, if sensor data is received, the security system 10 remains in Security mode. In some embodiments, the sensor data must also satisfy a criterion qualifying the sensor data as relevant to a threat in order to maintain the system in Security mode. However, if sensor data is not received, the system proceeds to step 906 and invoked Low Power Security mode. As noted above, Low Power Security mode may functionally be similar to Security mode but may run a different selection of sensors at a decreased resolution. At decision 908, if sensor data is received, the system proceeds to decision 910. At decision 910, if the sensor data satisfies a threat criterion, the system invokes Security mode and returns to step 902. If the sensor data does not satisfy this threat criterion, the security system 10 returns to step 906.

If, at decision 904 no sensor data is received, the security system 10 proceeds to step 912 and invoke Very Low Power Security Mode. At decision 914, if sensor data is received, the system returns to step 906 and invoked Low Power Security Mode. If no sensor data is received, the security system 10 returns to step 912 to determine whether any sensor data has been received within Very Low Power Security mode. As noted above, Very Low Power Security mode may invoke a similar selection of sensors as Low Power Security mode but may operate them at a lower resolution so as to reduce power consumption of the device.

Figure 10:
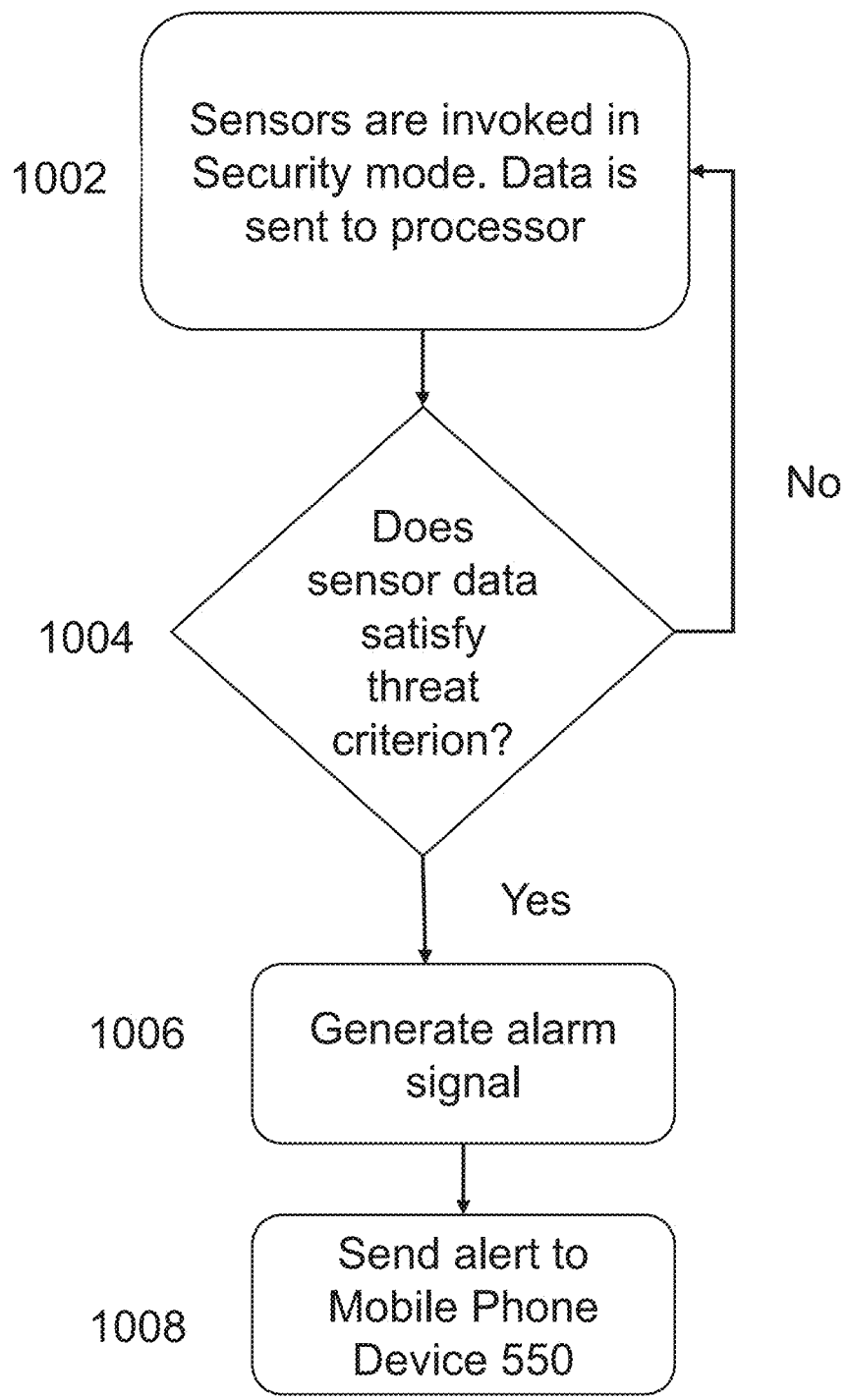
FIG. 10 is a flow diagram of the in-vehicle security system being triggered in Security Mode to generate an alert according to one or more embodiments of the present invention.

FIG. 10 is an illustrative embodiment of how the security system 10 alerts a user to a security event. At step 1002, the security system 10 is in Security mode and thus a specific selection of sensors operating at a specific resolution are in use. At decision 1004, if the sensors detect an event that satisfies a threat criterion, an alarm signal is generated at step 1006. At step 1008, this alarm signal prompts the security system 10 to send an alert to Mobile Phone Device 550. In some embodiments, the generation of the alarm signal also prompts the security system 10 to record the sensor data relating to the event to memory 520/528. In some embodiments, the alert sent to an external device such as a mobile phone device or the like will be accompanied by certain sensor data such as camera image data and/or microphone data such that the user may view said sensor data on the external device. The relevant sensor data representative of the event satisfying the threat criterion may be streamed to the Mobile Phone Device 550 and also may be stored to memory 520/528. Suitably, this may allow a user to contact an emergency service, send audio data to the security system 10 to play via the microphone 506 as a deterrent, or take other action to address the event. In decision 1004, if sensor data satisfies a threat criterion, an alarm signal is generated in step 1006. In some embodiments, the generation of the alarm signal also prompts the security system 10 to record the sensor data relating to the event to memory 520/528. In some embodiments, the IMU operating in Driving mode samples the values of acceleration at a frequency of 416 Hz and may be configured in FIFO mode. In some embodiments, the processing resource polls the IMU at a frequency of 16 Hz and reads all of the values stored on board the IMU. In some embodiments, the IMU will send an interrupt signal to the processing resource of the system if an acceleration exceeding a threshold is measured.

In some embodiments, the radar sensors collect data that satisfies the threat criterion by detecting object parameters that exceed a certain value. The object parameters may be one or more of angle, amplitude, distance, and velocity. Particular values suitable for the threshold may be derived by a person skilled in the art of trial using their common general knowledge or by trial and error in order to suit the operational objectives.

In some embodiments, the data collected by the radar sensors is passed through an algorithm to determine events of interest and/or to determine if said values satisfy the threat criterion In some embodiments, the values of acceleration captured by the IMU are passed through an algorithm to determine events of interest and/or to determine if said values satisfy the threat criterion. If these values do satisfy the threat criterion, the alarm signal of step 1006 is generated. In some embodiments, in response to the generation of the alarm signal of step 1006, the system commits the sensor data satisfying the threat criterion to memory 520/528. In some embodiments, in response to the generation of the alarm signal of step 1006, the system commits the sensor data satisfying the threat criterion to memory 520/528 along with concurrent sensor data from the other sensors operative in Security mode.

In some embodiments, the location sensor will push location data to the processing resource of the system periodically at a frequency of 10 Hz. In some embodiments, the memory 520/528 of the system has an additional cache that holds data from the sensors received over a specified time period, or of a specific size. In some embodiments, the data collected by the sensors is timestamped with an absolute timestamp. In some embodiments, the data collected by the sensors is timestamped with a relative timestamp.

Figure 11:
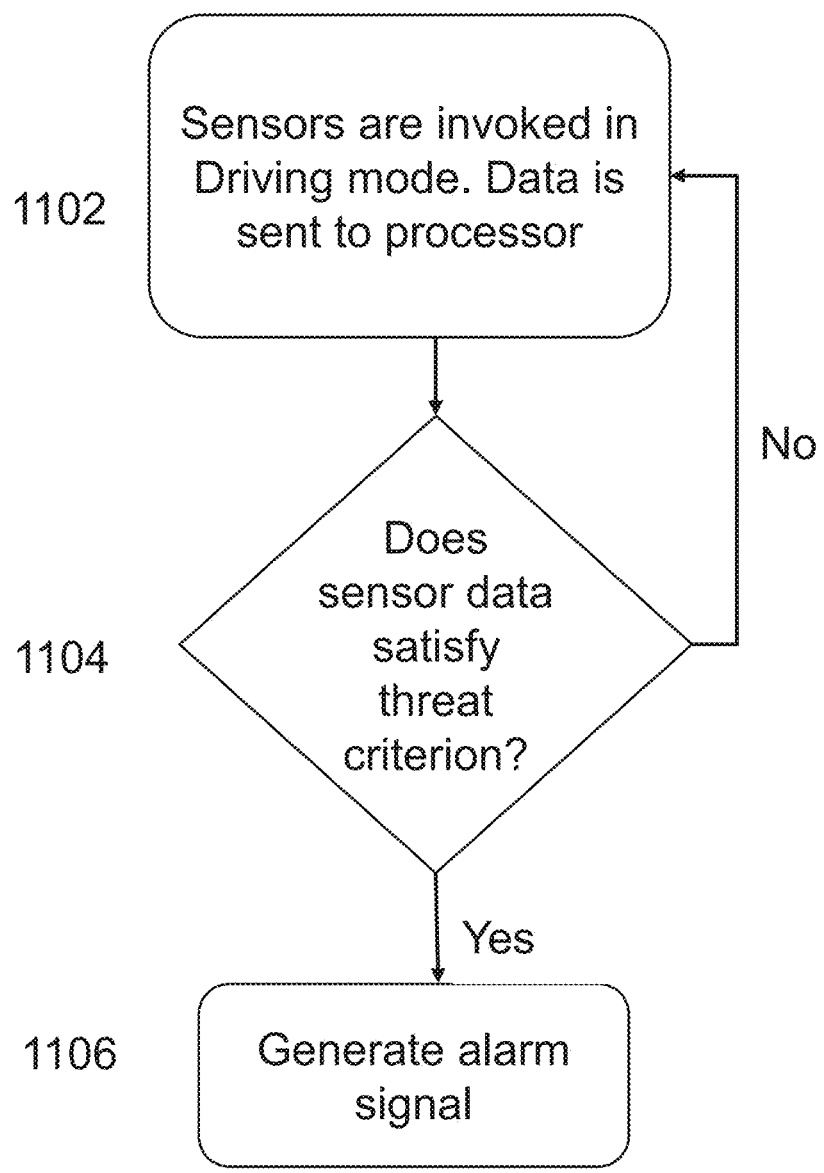
FIG. 11 is a flow diagram of the in-vehicle security system being triggered in Driving Mode to generate an alarm signal according to one or more embodiments of the present invention.

FIG. 11 is an illustrative embodiment of how the security system 10 identifies and records a driving event. In step 1102, the security system 10 is in Driving mode. As noted above, Driving mode invokes the use of a specific selection of sensors operating at a specific resolution. In decision 1104, if the sensor data satisfies a threat criterion, an alarm signal is generated in step 1106. In some embodiments, the generation of the alarm signal also prompts the security system 10 to record the sensor data relating to the event to memory 520/528. In some embodiments, the IMU operating in Driving mode samples the values of acceleration at a frequency of 416 Hz and may be configured in FIFO mode. In some embodiments, the processing resource polls the IMU at a frequency of 16 Hz and reads all of the values stored on board the IMU. In some embodiments, the IMU will send an interrupt signal to the processing resource of the system if an acceleration exceeding a threshold is measured.

In some embodiments, the values of acceleration captured by the IMU are passed through an algorithm to determine events of interest and/or to determine if said values satisfy the threat criterion. If these values od satisfy the threat criterion, the alarm signal of step 1106 is generated. In some embodiments, in response to the generation of the alarm signal of step 1106, the system commits the sensor data satisfying the threat criterion to memory 520/528. In some embodiments, in response to the generation of the alarm signal of step 1106, the system commits the sensor data satisfying the threat criterion to memory 520/528 along with concurrent sensor data from the other sensors operative in Driving mode.

In some embodiments, the threat criterion is satisfied by one or more sensors collecting data that exceeds a given threshold value. In some embodiments, the IMU collects data that satisfies the threat criterion by detecting accelerations that exceed a certain value. Typical values suitable for such a threshold are 100 milli g (mg).

Figure 12:
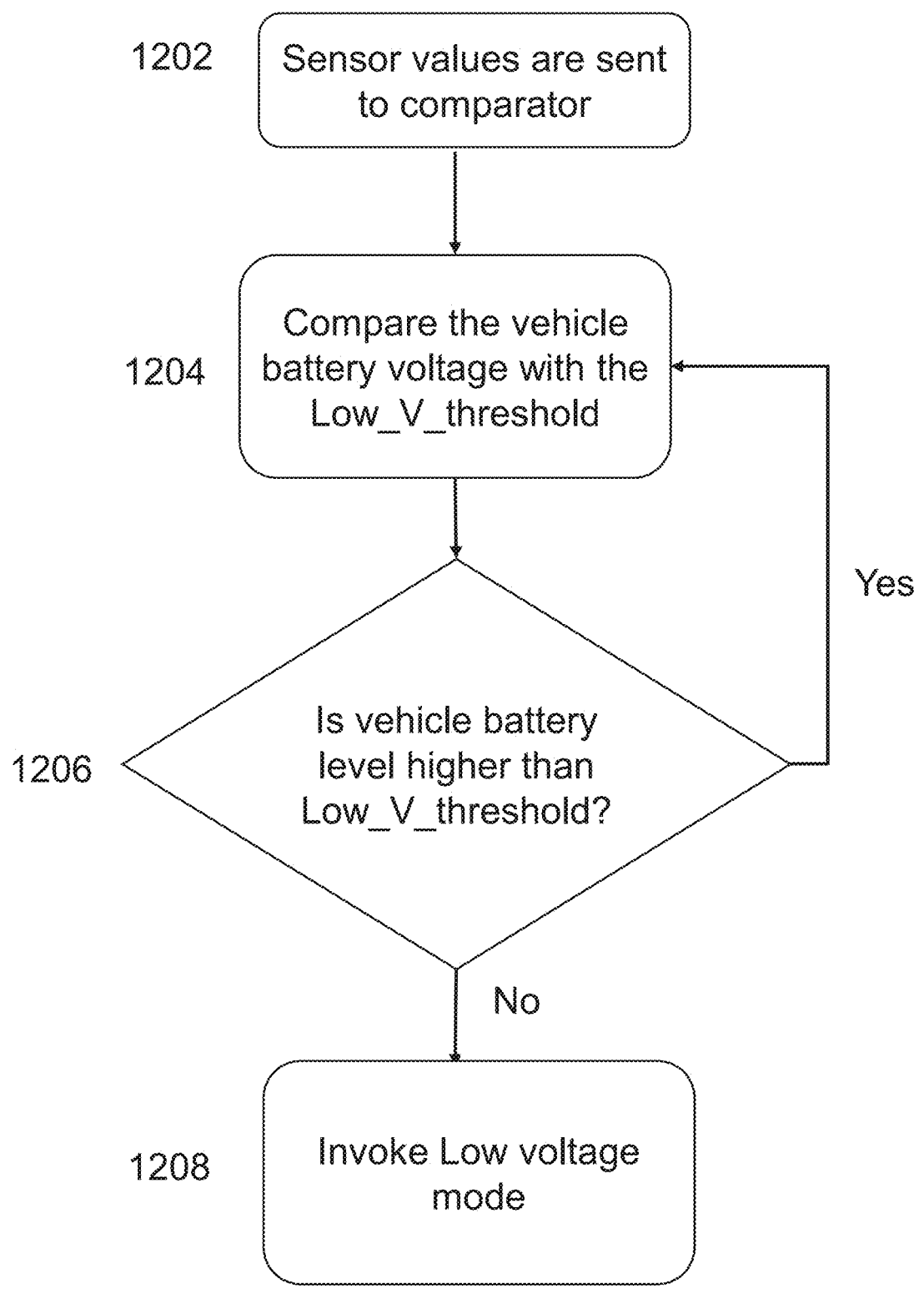
FIG. 12 is a flow diagram of the in-vehicle security system being triggered to enter Low Voltage mode according to one or more embodiments of the present invention.

FIG. 12 is an illustrative embodiment of how the security system 10 protects against an unacceptably low vehicle electrical power supply level. At step 1202, regardless of the mode the system is operating in, the voltage sensor monitors the voltage of the vehicle electrical power level. To do this, the ADC in invoked and the values from the ADC are sent to the comparator. In step 1004, the comparator then compares these collected values with the value stored in memory 520/528 Low_V_threshold. At decision 1206, if the vehicle electrical power level is found by the comparator to be lower than Low_V_threshold, the system proceeds to step 1208 and Low Voltage mode is invoked. If not, the system returns to step 1204 and compares the vehicle electrical power levels provided by the ADC to the comparator. In step 1208, Low Voltage mode is invoked, in which all sensors are disengaged other than the voltage sensor. In some embodiments, the process of steps 1202 to 1206 are repeated every 500 ms. In some embodiments, Low Voltage mode is invoked only if the vehicle electrical power level falls below Low_V_threshold and remains below Low_V_threshold for a specified time period. In some embodiments, this specified time period is 30 seconds. In some embodiments, the total time taken to sample the vehicle electrical power level between steps 1202 and 1206 is 62.5 ms. In some embodiments, the vehicle electrical power level will be polled continuously. In some embodiments, the vehicle electrical power level will be polled every 60 s.

In an illustrative embodiment, Low Voltage Mode invokes the use of the voltage sensor but no other sensors. If an increase in available vehicle electrical power is detected indicative of the engagement of the engine and alternator, the processor invokes Driving Mode. In an illustrative embodiment, Low Voltage Mode operates no sensors and polls the voltage sensor to check whether an increase in available power can be detected. This would typically result from the engine starting and the alternator providing power to the vehicle battery. In some embodiments, the voltage sensor is polled every 30 s.

Figure 13:
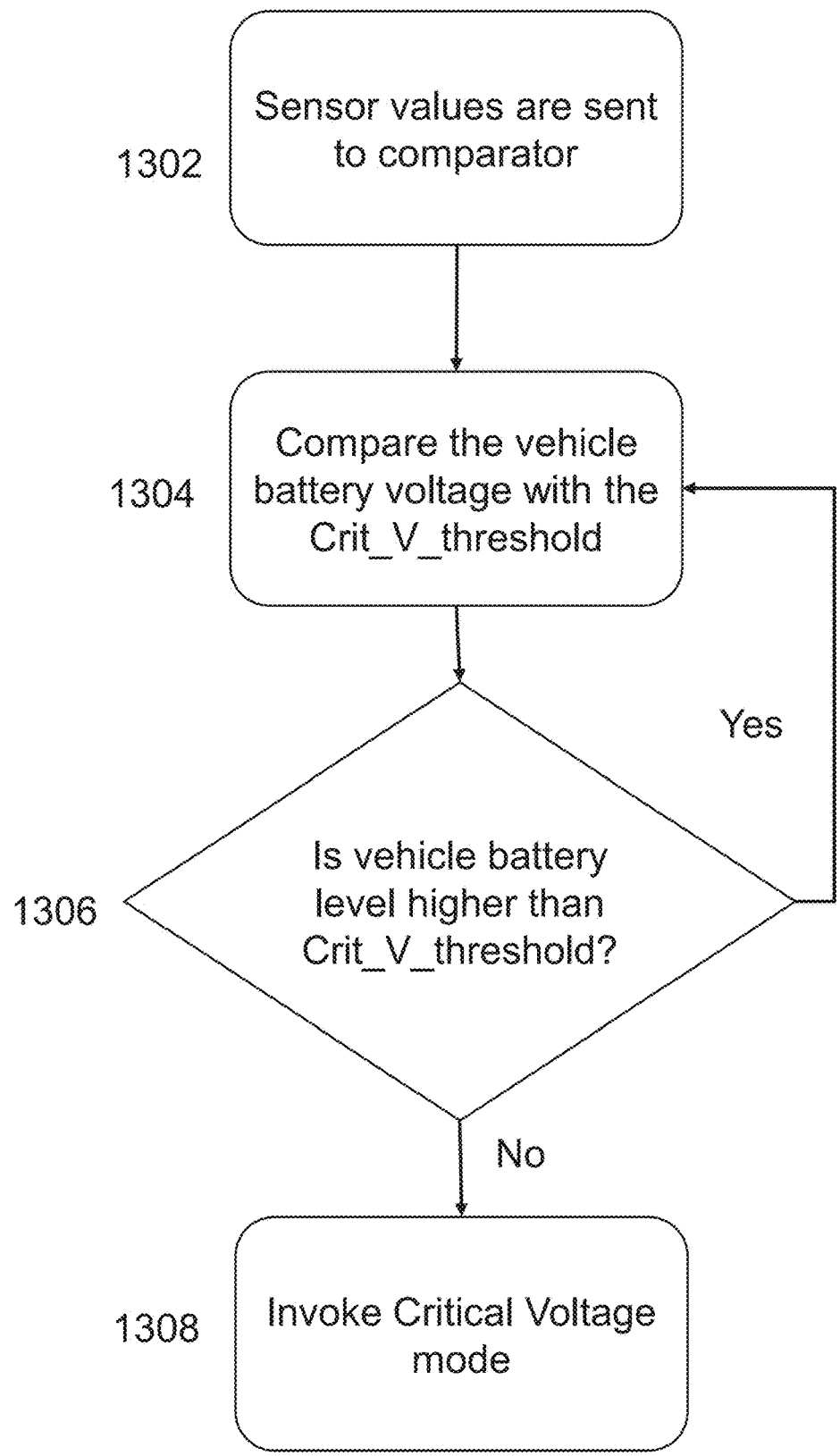
FIG. 13 is a flow diagram of the in-vehicle security system being triggered to enter Critical voltage mode according to one or more embodiments of the present invention.

FIG. 13 is an illustrative embodiment of how the security system 10 protects against a critically low vehicle battery level. At step 1302, regardless of the mode the system is operating in, the voltage sensor monitors the vehicle electrical power supply of the vehicle battery. To do this, the ADC is invoked and the values from the ADC are sent to the comparator. In step 1304, the comparator then compares these collected values with the value stored in memory 520/528 Crit_V_threshold. At decision 1306, if the vehicle voltage level is found by the comparator to be lower than Crit_V_threshold, the system proceeds to step 1308 and Critical Voltage mode is invoked. If not, the system returns to step 1304 and compares the vehicle voltage levels provided by the ADC to the comparator. In step 1308 Critical Voltage mode is invoked, in which all sensors are disengaged and the security system 10 is shut down. In some embodiments, the process of steps 1302 to 1306 is repeated every 500 ms.

In some embodiments, whilst the system is in Driving mode or Security mode, the vehicle battery is sampled continuously to monitor for the vehicle electrical power supply falling below Crit_V_threshold. In some embodiments, whilst the system is in Low Power Security mode, Very Low Power Security mode, Update mode or Low voltage mode, the vehicle electrical power supply is polled and/or sampled at intervals to monitor for the vehicle electrical power supply falling below Crit_V_threshold. In some embodiments, Crit_V_threshold is set to 5V. In some embodiments, Crit_V_threshold is set by a user.

In some embodiments, when the system is in Update mode, the voltage sensor and radar sensor or radar sensors are operative but all other sensors are not or are idle. When the system is in System Update mode, firmware and/or software updates are received by the system via cabled connection or via wireless connection, and the system applies these updates.

In some embodiments, responsive to the system being switched on, the voltage sensor performs a check of whether the vehicle battery voltage is higher than the Low_V_threshold. In some embodiments, if the vehicle battery level is not higher than Low_V_threshold, the system automatically enters Low Voltage mode.

In some embodiments, a wake-up command can be sent from the Mobile Phone Device 550 to the security system 10 to change the operating mode of the system 10 from Very Low Power Security mode or Low Power Security mode to Security mode. This wake-up command can be received by the 4G/LTE module 514 or by the Wi-Fi module 516. In some embodiments, responsive to receipt of a wake-up command, the system invokes Security mode.

In an illustrative embodiment, the security system 10 may be triggered to change into Driving mode via detection of a vehicle voltage level higher than driving_threshold, or is triggered to change into Driving mode through the detection that the vehicle is moving. This detection is provided by the acceleration sensor or by the location sensor. If these sensors indicate that the vehicle has been non-stationary for a specific duration of time, a signal will be sent to the processor 526 to change the mode of the security system 10 into Driving mode. This specific duration of time may be 2 seconds.

In an illustrative embodiment, the security system 10 is triggered to change into Security mode via detection of a vehicle voltage level lower than security_threshold, or it is triggered to change into Security mode through the detection that the vehicle has stopped moving. In some embodiments, this detection is provided by the acceleration sensor or by the location sensor. If these sensors indicate that the vehicle has been stationary for a specific duration of time, a signal is sent to the processor 526 to change the mode of the security system 10 into Security mode. This specific duration of time may be 1-5 minutes.

The application refers the security system being used in a car. However, it must be appreciated that the security system is not limited to use in a car only; any vehicle may be used such as, a lorry, a taxi, a bus, or a mini bus.

It will be appreciated by a person skilled in the art that in the above description, ADC is interchangeable with opamp.

It will appreciated by a person skilled in the art that the term resolution mentioned in could refer to image or video resolution, but it may also encompass sensor data resolution, such as spatial, temporal, or spectral resolution, depending on the sensor type.

It will be appreciated that the devices shown in FIGS. 2a-c, and 3a-b are just one implementation of a security device. For example, the first device is not limited to the pendant shape or the round mounting end. Other solutions may be possible to provide a flexible mounting system allowing a range of adjustment for the camera 102, such as pivotable lenses in the case of a fixed mount. A person skilled in the art would appreciate there are many other systems that could be employed.

The 3M™ sticky pad 107 could be any such means to fix the first device 100 to a support structure (e.g. windscreen), such as suction pad, glue pad and the like.

It will be appreciated by a person skilled in the art that the wired connection 110/412 is just one example of how two devices may be connected so as to transfer data and video between them. Of course, other examples may include wireless connections such as Bluetooth™, WiFi, 4G, radio frequency (RF), and the like.

The security system 10 discloses the use of RADAR technology for object detection. Other forms of object detection and ranging can be used such as LIDAR, Passive infrared sensors, Sonar, Computer Vision, Quantum Radar and others.

It will be understood by those skilled in the art that the drawings are merely diagrammatic and that further items of equipment may be required in a commercial apparatus. The position of such ancillary items of equipment forms no part of the present invention and is in accordance with conventional practice in the art.

Insofar as embodiments of the invention described above are implementable, at least in part, using a software-controlled programmable processing device such as a general purpose processor or special-purposes processor, digital signal processor, microprocessor, or other processing device, data processing apparatus or computer system it will be appreciated that a computer program for configuring a programmable device, apparatus or system to implement methods and apparatus is envisaged as an aspect of the present invention. The computer program may be embodied as any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as, Liberate, OCAP, MHP, Flash, HTML and associated languages, JavaScript, PHP, C, C++, Python, Nodejs, Java, BASIC, Perl, Matlab, Pascal, Visual BASIC, ActiveX, assembly language, machine code, and so forth. A skilled person would readily understand that term "computer" in its most general sense encompasses programmable devices such as referred to above, and data processing apparatus and computer systems.

Suitably, the computer program is stored on a carrier medium in machine readable form, for example the carrier medium may comprise memory, removable or non-removable media, erasable or non-erasable media, writeable or re-writeable media, digital or analog media, hard disk, floppy disk, Compact Disk Read Only Memory (CD-ROM), Company Disk Recordable (CD-R), Compact Disk Rewriteable (CD-RW), optical disk, magnetic media, magneto-optical media, removable memory cards or disks, various types of Digital Versatile Disk (DVD) subscriber identity module, tape, cassette solid-state memory.

In view of the foregoing description, it will be evident to a person skilled in the art that various modifications may be made within the scope of the invention.

The security system 10 has been described using of cameras with specific resolutions such as 4K and 1440P. However, it should be appreciated that the security system is not limited to these resolutions only; any camera resolution may be utilized as needed to provide adequate image capturing capabilities.

The security system 10 has been described mounting the cameras and radar units in specific positions on the vehicle. However, it must be appreciated that other mounting locations may be used to provide visibility of desired areas around the vehicle while avoiding occlusion.

The security system 10 refers to the use of a 4G/LTE wireless module specifically. However, it should be appreciated that any suitable wireless communication standard may be utilized such as 5G, Wi-Fi, Bluetooth, etc.

The security system 10 has been described using a comparator to monitor battery voltage levels. However, it must be appreciated that other mechanisms for voltage sensing may be utilized, such as analog-to-digital converters, operational amplifiers, and various integrated voltage monitoring circuits, etc.

In at least one of the described embodiments the low power security mode is maintained when the processing resource determines that a system condition is satisfied. One such condition is the expiration of a first system time duration in the low power security mode. However, other system conditions may also be utilized to determine when to switch between modes, such as determining that the vehicle has remained stationary for a particular time period based on inputs from accelerometers, gyroscopes, inertial sensors, etc; detecting a minimum threshold battery voltage level; receiving a mode change command from a user; sensing daylight or darkness to switch modes based on expected activity levels using light sensors; monitoring energy usage over time and adapting to maintain battery charge; and other possible conditions discernible by processing inputs from cameras, radar, Lidar, ultrasonic sensors, temperature probes, smoke detectors, vibration sensors, microphones and other sensing systems installed in the security system.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Moreover, one or more features of different embodiments may be combined to create further embodiments not specifically described herein, and any one or more features may be combined consistent with their technical and operational compatibility. To the extent that one or more features from respective embodiments may not be combined without being inconsistent with the technical and/or operational compatibility such features from respective embodiments may be selected for combination which do not have such technical and/or operational compatibility. All such embodiments are contemplated within the scope of this disclosure.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

We claim:

1. A security system for an in-vehicle digital video recorder, comprising a sensor and a processing resource, the security system operative in:
   a first mode in which the sensor is operative at a first resolution; and
   a second mode in which the sensor is operative at a second resolution higher than the first resolution;
   the security system operative to receive signals from the sensor;
      wherein in the first mode the security system is operative to invoke the second mode responsive to a sensor signal exceeding a threshold value; and
      wherein in the second mode the processing resource monitors to determine if a security threat criterion is satisfied based on a received sensor signal.

2. A security system according to claim 1, wherein the security system is operative to maintain the second mode responsive to the processing resource determining a system condition is satisfied.

3. A security system according to claim 2, wherein the system condition is expiry of a first system time duration.

4. A security system according to claim 3, wherein the first system time duration is configurable and is stored in a system memory, wherein the first system time duration is 50-1000 milliseconds (ms).

5. A security system according to claim 2, wherein the system condition to maintain the security system in the second mode is traversal of a first system number of security threat criterion cycles.

6. A security system according to claim 5, wherein the first system number of security threat criterion cycles is stored in a system memory, wherein the first system number of security threat criterion cycles is 3.

7. A security system according claim 1, operative to invoke a third mode responsive to the processing resource determining that the security threat criterion is satisfied, the sensor configured in the third mode to operate at a third resolution higher than the second resolution and the first resolution.

8. A security system according to claim 7, further operative in the third mode to invoke a further sensor.

9. A security system according to claim 8, wherein the further sensor is invoked responsive to user actuation.

10. A security system according to claim 8, wherein the further sensor is a camera.

11. A security system according to claim 7, further operative in the third mode to generate an alert signal responsive to determining that a sensor signal or a further sensor signal satisfies a second security threat criterion.

12. A security system according to claim 11, wherein the alert signal is transmitted to a wireless communication device to alert a user.

13. A security system according to claim 7, further operative to invoke a fourth mode responsive to the security system detecting a security system power supply achieving a second threshold value, the fourth mode being functionally independent of the first, second and third modes and in which the further sensor is operative.

14. A security system according to claim 13, wherein the security system invokes:
   the third mode; or
   the second mode; or
   the first mode; responsive to the security system detecting a decrease in the power supply to the security system from the second threshold value for a period of time indicative of the vehicle having been turned off.

15. A security system according to claim 14, wherein the security system enters the third mode responsive to the security system detecting a decrease in the power supply to the security system from the second threshold value for a period of time indicative of the vehicle having been turned off; and
   wherein the security system enters the second mode responsive to the security system detecting a decrease in the power supply to the security system from a third threshold value wherein the third threshold value is lower than the second threshold value; and
   wherein the security system enters the first mode responsive to the security system detecting a persistent decrease in the power supply to the security system from a fourth threshold value wherein the fourth threshold value is lower than the third threshold value.

16. A security system according to claim 14, wherein the security system enters the third mode responsive to the security system detecting a decrease in the power supply to the security system from the second threshold value for a period of time indicative of the vehicle having been turned off; and
   wherein the security system enters the second mode after a second system time duration in which no sensor signals have satisfied the second security threat criterion wherein the second system time duration is configurable and is stored in the system memory; and
   wherein the security system enters the first mode after the first system time duration.

17. The security system according to claim 13, wherein the security system is further operative to invoke the fourth mode responsive to the security system detecting initiation of vehicle motion based on computer vision analysis of image data captured by the further sensor.

18. A security system according to claim 17, wherein the security system is configured to invoke the third mode responsive to the security system detecting cessation of vehicle motion based on computer vision analysis of image data captured by the further sensor for a period of time exceeding a first motion cessation threshold; and
   wherein the security system is configured to invoke the second mode after a time duration which exceeds a second motion cessation threshold, starting from when motion cessation was detected; and
   wherein the security system is configured to invoke the first mode after a time duration which exceeds a third motion cessation threshold, starting from when motion cessation was detected wherein the third threshold value is longer in time than the second motion cessation threshold.

19. A security system according to claim 13, further operative in the fourth mode to generate a further alert signal responsive to determining that a sensor signal satisfies a third security threat criterion.

20. A security system according to claim 1, in which the sensor is any one of: a radar sensor; a location sensor; an acceleration sensor; a sound sensor; and an infrared sensor.

21. A security system according to claim 1, in which the security threat criterion is satisfied by a signal indicative of any one of or a combination of:
an object moving towards the security system;
the security system changing geographical location;
the security system experiencing significant acceleration; and
a non-typical level of noise.

22. A security system according to claim 11, in which the second security threat criterion is satisfied by a signal indicative of any one of or a combination of:
an object moving towards the security system;
the security system changing geographical location;
the security system experiencing significant acceleration; and
a non-typical level of noise.

23. A security system according to claim 17, in which the third security threat criterion is satisfied by a signal indicative of any one of or a combination of:
an object moving towards the security system;
the security system changing geographical location;
the security system experiencing significant acceleration; and
a non-typical level of noise.

24. A security system according to claim 19, wherein a signal indicative of:
an object moving towards the security system is provided by a radar sensor;
the security system is changing geographical location is provided by a location sensor;
the security system is experiencing significant acceleration is provided by an acceleration sensor; and
the security system is experiencing a non-typical level of noise is provided by a noise sensor.

25. A security system according to claim 22, wherein
the acceleration sensor is one of more of: an accelerometer; a gyroscope; a magnetometer; and an inertial motion unit; and
wherein the location sensor is one or more of: a GPS sensor or a GNSS sensor; and
wherein the noise sensor is one or more of: a microphone sensor; an acoustic noise sensor; a potentiometer; a voltage sensor; an electrical noise sensor and a voltmeter.

* * * * *